(12) United States Patent
Ernst et al.

(10) Patent No.: US 11,912,568 B2
(45) Date of Patent: Feb. 27, 2024

(54) METHODS OF PRODUCING A GAS AT A CONTROLLED RATE

(71) Applicant: ICA TriNova, LLC, Newnan, GA (US)

(72) Inventors: William Ernst, Roswell, GA (US); Thomas Isaac, Newnan, GA (US)

(73) Assignee: ICA TriNova, LLC, Newnan, GA (US)

(*) Notice: Subject to any disclaimer, the term of this patent is extended or adjusted under 35 U.S.C. 154(b) by 109 days.

(21) Appl. No.: 16/353,134

(22) Filed: Mar. 14, 2019

(65) Prior Publication Data

US 2019/0284049 A1 Sep. 19, 2019

Related U.S. Application Data

(60) Provisional application No. 62/642,745, filed on Mar. 14, 2018.

(51) Int. Cl.
*C01B 11/02* (2006.01)
*C01B 32/50* (2017.01)
(Continued)

(52) U.S. Cl.
CPC ............ *C01B 11/022* (2013.01); *C01B 32/50* (2017.08); *B01J 8/008* (2013.01); *B01J 8/048* (2013.01);
(Continued)

(58) Field of Classification Search
CPC .............................. C01B 11/022; C01B 11/023
See application file for complete search history.

(56) References Cited

U.S. PATENT DOCUMENTS 2,163,793 A 6/1939 Ogden
2,482,891 A 9/1949 Aston
(Continued)

FOREIGN PATENT DOCUMENTS

CN 1820607 A 8/2006
CN 100387518 C 5/2008
(Continued)

OTHER PUBLICATIONS

Brickhouse, et al., "Effects of Vapor-Based Decontamination Systems on Selected Building Interior Materials: Chlorine Dioxide", EPA/600/R-08/054. Apr. 2008.
(Continued)

*Primary Examiner* — Anita Nassiri-Motlagh
(74) *Attorney, Agent, or Firm* — Meunier Carlin & Curfman

(57) ABSTRACT

Disclosed herein are methods of producing a gas at a controlled rate, the methods comprising directing air through a layered bed to produce a gas. The layered bed comprises alternating layers of a layer of dry particles comprising a precursor and a layer of dry particles comprising a proton-generating species. The gas is produced at a rate that is controlled by controlling the presence or absence of air flowing though the layered bed, the amount of time the air flows through the layered bed, the total number of layers in the layered bed, the average thickness of each of the layers of dry particles comprising the precursor in the layered bed, the average thickness of each of the layers of dry particles comprising the proton-generating species in the layered bed, the temperature the method is performed at, or a combination thereof.

18 Claims, 6 Drawing Sheets

(51) Int. Cl.
*B01J 8/04* (2006.01)
*B01J 8/00* (2006.01)

(52) U.S. Cl.
CPC .... *B01J 2208/025* (2013.01); *B01J 2208/027* (2013.01)

(56) References Cited

U.S. PATENT DOCUMENTS

| | | |
|---|---|---|
| 2,885,368 A | 5/1959 | Hess, V et al. |
| 3,049,399 A | 8/1962 | Gamson et al. |
| 3,271,242 A | 9/1966 | Mcnicholas |
| 3,298,780 A | 1/1967 | Fleck |
| 3,382,033 A | 5/1968 | Tetsuzo |
| 3,591,515 A | 7/1971 | Lovely |
| 3,997,462 A | 12/1976 | Denaeyer et al. |
| 4,247,531 A | 1/1981 | Hicks |
| 4,292,292 A * | 9/1981 | Hicks ................. C01B 11/024 423/477 |
| 4,362,753 A | 12/1982 | Barta et al. |
| 4,384,972 A | 5/1983 | Nakamura et al. |
| 4,528,171 A | 7/1985 | Casci et al. |
| 4,547,381 A | 10/1985 | Mason et al. |
| 4,554,261 A | 11/1985 | Gergely et al. |
| 4,581,219 A | 4/1986 | Imada et al. |
| 4,585,482 A | 4/1986 | Tice et al. |
| 4,590,057 A | 5/1986 | Hicks |
| 4,689,169 A | 8/1987 | Mason et al. |
| 4,695,296 A | 9/1987 | Christe |
| 4,731,193 A | 3/1988 | Mason et al. |
| 4,815,092 A | 3/1989 | Chartier |
| 4,871,701 A | 10/1989 | Danner et al. |
| 4,889,654 A | 12/1989 | Mason et al. |
| 5,008,096 A | 4/1991 | Ringo |
| 5,078,908 A | 1/1992 | Ripley et al. |
| 5,110,580 A | 5/1992 | Rosenblatt et al. |
| 5,246,622 A | 9/1993 | Shimizu et al. |
| 5,264,227 A | 11/1993 | Laroche et al. |
| 5,278,112 A | 1/1994 | Klatte et al. |
| 5,302,354 A | 4/1994 | Watvedt et al. |
| 5,306,440 A | 4/1994 | Ripley et al. |
| 5,314,852 A | 5/1994 | Klatte |
| 5,346,876 A | 9/1994 | Ichimura et al. |
| 5,360,609 A | 11/1994 | Wellinghoff |
| 5,376,164 A | 12/1994 | Zarchy et al. |
| 5,407,656 A | 4/1995 | Roozdar |
| 5,458,743 A | 10/1995 | Allen |
| 5,464,598 A | 11/1995 | Klatte et al. |
| 5,567,405 A | 10/1996 | Biswell et al. |
| 5,573,743 A | 11/1996 | Klatte et al. |
| 5,631,300 A | 5/1997 | Wellinghoff |
| 5,639,295 A | 6/1997 | Wellinghoff et al. |
| 5,668,185 A | 9/1997 | Wellinghoff |
| 5,707,739 A | 1/1998 | Wellinghoff et al. |
| 5,730,948 A | 3/1998 | Klatte et al. |
| 5,776,850 A | 7/1998 | Biswell et al. |
| 5,853,689 A | 12/1998 | Klatte |
| 5,855,822 A | 1/1999 | Chen |
| 5,885,543 A | 3/1999 | Klatte |
| 5,974,810 A | 11/1999 | Speronello |
| 5,989,497 A | 11/1999 | Labonte, Jr. |
| 6,077,495 A | 6/2000 | Speronello et al. |
| 6,132,748 A | 10/2000 | Khanna et al. |
| 6,174,508 B1 | 1/2001 | Klatte et al. |
| 6,238,643 B1 | 5/2001 | Thangaraj et al. |
| 6,267,953 B1 | 7/2001 | Bernier et al. |
| 6,379,643 B1 | 4/2002 | Klatte et al. |
| 6,383,541 B1 | 5/2002 | Danner et al. |
| 6,423,277 B1 | 7/2002 | Gravitt et al. |
| 6,423,289 B1 | 7/2002 | Klatte et al. |
| 6,458,735 B1 | 10/2002 | Klatte et al. |
| 6,503,419 B2 | 1/2003 | Klatte et al. |
| 6,592,919 B1 | 7/2003 | Matthews et al. |
| 6,602,466 B2 | 8/2003 | Hamilton et al. |
| 6,605,558 B2 | 8/2003 | Klatte et al. |
| 6,607,696 B1 | 8/2003 | Hamilton et al. |
| 6,635,230 B2 | 10/2003 | Klatte et al. |
| 7,220,367 B2 | 5/2007 | Speronello et al. |
| 7,273,567 B1 | 9/2007 | Wellinghoff et al. |
| 7,347,994 B2 | 3/2008 | Tenney et al. |
| 7,625,533 B2 | 12/2009 | Doona et al. |
| 7,883,640 B2 | 2/2011 | Doona et al. |
| 7,922,992 B2 | 4/2011 | Ernst et al. |
| 8,622,209 B2 | 1/2014 | Isaac et al. |
| 8,709,396 B2 | 4/2014 | Tenney et al. |
| 9,227,156 B2 | 1/2016 | Richardson et al. |
| 9,382,116 B2 | 7/2016 | Isaac et al. |
| 9,414,611 B2 | 8/2016 | Ernst et al. |
| 9,901,105 B2 | 2/2018 | Ernst et al. |
| 10,076,129 B1 | 9/2018 | Micka |
| 2001/0036421 A1 | 11/2001 | Speronello et al. |
| 2001/0038805 A1 | 11/2001 | Hamilton et al. |
| 2002/0028191 A1 | 3/2002 | Bernier et al. |
| 2002/0036284 A1 | 3/2002 | Speronello et al. |
| 2002/0056830 A1 | 5/2002 | Klatte et al. |
| 2002/0122854 A1 | 9/2002 | Danner et al. |
| 2003/0021819 A1 | 1/2003 | Khanna et al. |
| 2003/0082087 A1 | 5/2003 | Klatte et al. |
| 2003/0215381 A1 | 11/2003 | Rosenblatt et al. |
| 2004/0022676 A1 * | 2/2004 | Hamilton ................. C02F 1/76 422/37 |
| 2004/0051080 A1 | 3/2004 | Ernst et al. |
| 2006/0099121 A1 | 5/2006 | Doona et al. |
| 2007/0039898 A1 | 2/2007 | Dee |
| 2007/0081919 A1 | 4/2007 | Koermer et al. |
| 2007/0237671 A1 | 10/2007 | Yuan et al. |
| 2008/0025870 A1 | 1/2008 | Groenewegen et al. |
| 2008/0131395 A1 | 6/2008 | Wellinghoff et al. |
| 2010/0075004 A1 | 3/2010 | Nelson et al. |
| 2010/0209332 A1 | 8/2010 | Hratko et al. |
| 2011/0062086 A1 * | 3/2011 | Burns ................. C02F 1/763 210/739 |
| 2011/0150748 A1 * | 6/2011 | Thangaraj ............. C01B 11/024 423/477 |
| 2012/0024744 A1 | 2/2012 | Harrison et al. |
| 2013/0287722 A1 | 10/2013 | Uhlmann |
| 2014/0086821 A1 | 3/2014 | Ozawa et al. |
| 2014/0147360 A1 | 5/2014 | Richardson et al. |
| 2015/0173381 A1 | 6/2015 | Micka et al. |
| 2015/0173382 A1 | 6/2015 | Ernst et al. |
| 2015/0273096 A1 * | 10/2015 | Takimoto ............. C01B 11/024 422/187 |
| 2017/0202876 A1 * | 7/2017 | Pugliese ................. A61K 8/416 |
| 2017/0332674 A1 | 11/2017 | Annous et al. |

FOREIGN PATENT DOCUMENTS

| | | |
|---|---|---|
| CN | 101253881 A | 9/2008 |
| CN | 101411334 A | 4/2009 |
| CN | 102249194 A | 11/2011 |
| CN | 102422841 A | 4/2012 |
| CN | 105453920 A | 4/2016 |
| EP | 0132049 A1 | 1/1985 |
| EP | 0159660 A2 | 10/1985 |
| JP | S52038028 B1 | 9/1977 |
| JP | S5667521 U | 6/1981 |
| JP | S58161904 U | 9/1983 |
| JP | S60827 Y2 | 1/1985 |
| JP | S61256915 A | 11/1986 |
| JP | S6471804 A | 3/1989 |
| JP | 02009318 | 1/1990 |
| JP | H02198629 A | 8/1990 |
| JP | H03979 U | 1/1991 |
| JP | H0323863 U | 3/1991 |
| JP | 6285368 B2 | 10/1994 |
| JP | 08309099 A | 11/1996 |
| JP | 5342054 B2 | 8/2013 |
| JP | 2014196207 A | 10/2014 |
| KR | 20040095440 A | 11/2004 |
| KR | 200380383 Y1 | 3/2005 |
| KR | 100726421 B1 | 6/2007 |
| KR | 20130018756 A | 2/2013 |
| KR | 20130079244 A | 7/2013 |
| KR | 20160011341 A | 2/2016 |

(56) References Cited

FOREIGN PATENT DOCUMENTS

| WO | 8505008 A1 | 11/1985 |
|---|---|---|
| WO | 8505038 A1 | 11/1985 |
| WO | 9811776 A1 | 3/1998 |
| WO | 9838865 A1 | 9/1998 |
| WO | 9962817 A1 | 12/1999 |
| WO | 0010695 A1 | 3/2000 |
| WO | 0035495 A1 | 6/2000 |
| WO | 0065910 A1 | 11/2000 |
| WO | 0069775 A1 | 11/2000 |
| WO | 03051407 A1 | 6/2003 |
| WO | 2015098730 A1 | 7/2015 |

OTHER PUBLICATIONS

Calderon et al. "Chlorine Dioxide absorption by potatoes in a packed bed," Poster, Orlando, FL, Jan. 6, 2015.

Chen. "A Focus on Chlorine Dioxide: The Promising Food Preservative," Journal of Experimental Food Chemistry, 2017, 3(1), 1000e107.

Crawford, et al., "Decomposition Rate Studies in the Gaseous Chlorine Dioxide-Water System", APPI, 1968, 51(5), pp. 226-230.

DeVries. "Chlorine Dioxide Trial Strawberries," Well-Pict, Oxnard, VA, Nov. 11, 2010.

FoodDefend, FruitGard, Brochure, Aug. 21, 2014 (2 pages).

Gomez-Lopez, et al., "Chlorine dioxide for minimally processed produce preservation: a review", Trends in Food & Science Technology, 2009, 20, 17-26.

Grevens et al. "Evaluation of FruitGard and standard post-harvest fungicides for control of potato pink rot and silver scurf under storage conditions," Poster, University of Wisconsin, Madison, WI, Jan. 5, 2015.

Lorcheim. "Reducing Food Recalls with Microbial Fumigation of Food Processing Facilities," Food Protection Trends, Sep.-Oct. 2013, 334-336.

Mahovic, et al., "Applications of Chlorine Dioxide Gas for Control of Bacterial Soft Rot in Tomatoes", Plant Disease, 2007, 91(10), 1316-1320.

McHale, et al., "The Explosive Decomposition of Chlorine Dioxide", Journal of Physical Chemistry. 1968, 72(6), pp. 1849-1856.

Netramai, , "Utilization of Chlorine Dioxide Gas in Food Packaging Applications.", Thesis. Michigan State University. 2011.

O'Connell. "On 'Gard': New option emerges for rot control in potato storage," Spudman, Jul./Aug. 2018, pp. 16-17.

Olsen, et al., "Efficacy of chlorine dioxide for disease control on stored potatoes", American Journal of Potato Research, 2003, 80, 387-395.

Olsen, et al., "The use of chlorine dioxide in potato storage", University of Idaho, College of Agriculture, 2000, Bulletin 825.

Rao, et al., "Perchlorate Formation by Ozone Oxidation of Aqueous Chlorine/Oxy-Chlorine Species: Role of ClxOy Radicals", Environmental Science and Technology. 2010, 44, pp. 2961-2967.

Scruggs et al. "Cultural, Chemical, and Alternative Control Strategies for Rhizopus Soft Rot of Sweetpotato," Plant Disease, 2016, 100(8), 1532-1540.

Simpson, et al., "A focus on Chlorine Dioxide: The 'Ideal' Biocide", 2000, Houston, Tex. Unichem Intl. Inc., 20 pages, Available from:www.clo2.com/reading/waste/corrosion.html, accessed on Sep. 19, 2008.

Smith et al. "Distribution and chemical fate of 36Cl-Chlorine dioxide gas during the fumigation of tomatoes and cantaloupe," Journal of Agricultural and Food Chemistry, 2014, 62, 11756-11766.

Smith et al. "Chloroxyanion Residues in Cantaloupe and Tomatoes after Chlorine Dioxide Gas Sanitation," Journal of Agricultural and Food Chemistry, 2015, 63, 9640-9649.

Spinks, et al., "Photodecomposition of Chlorine Dioxide", ACS, 1934, 56(2), pp. 264-270.

Sy. Evaluation of Chlorine dioxide gas as a sanitizer for fresh fruits and vegetables. Masters Thesis, University of Georgia, 2004, 127 pages.

Sy et al. Evaluation of Gaseous Chlorine Dioxide as a Sanitizer for Killing *Salmonella, Escherichia coli* O157:H7, Listeria monocytogenes, and Yeasts and Molds on Fresh and Fresh-Cut Produce, Journal of Food Protection, 2005, 68(6), 1176-1187.

Tenney. Z Series Coil Cleaner, Tri Fold Brochure, Newnan, GA, Mar. 19, 2013 (2 pages).

Tenney, ICA TriNova, FoodDefend Interventions, Presentation, Ft. Pierce, FL, Oct. 27, 2016.

Tenney, ICA TriNova, Safety Data Sheet, FruitGard Maintenance Part A, Sep. 18, 2013.

Tenney, ICA TriNova, Safety Data Sheet, FruitGard Maintenance Part B, Jun. 18, 2013.

Tenney, ICA TriNova, Safety Data Sheet, FruitGard Wipeout Part A, Sep. 18, 2013.

Tenney, ICA TriNova, Safety Data Sheet, FruitGard Wipeout Part B, Jun. 18, 2013.

Tenney. Z Series brochure, Marietta, GA, Sep. 29, 2008 (1 page).

Trinetta, et al., "Evaluation of Chlorine Dioxide Gas Residues on Selected Food Produce", Journal of Food Science, 2011, 76(1), T11-T15.

Tsai, et al., "Prevention of Potato Spoilage During Storage by Chlorine Dioxide", Journal of Food Science, 2001, 66(3), 472-477.

Vandekinderen, et al., "Effects of tantalum oxide films on stability and optical memory in electrochromic tungsten oxide films", International Journal of Food Microbiology, 2009, 131, 138-144.

Wu et al. "A simple gaseous chlorine dioxide method for microbial decontamination on potatoes during storage," Poster, University of Maine, Aug. 4, 2008.

Wu et al. "A simple instrument-free gaseous chlorine dioxide method for microbial decontamination of potatoes during storage." Food Microbiology, 2010, 27, 179-184.

Xin, et al., "Highly Selective Spectrophotometric Determination of Chlorine Dioxide in Water using Rhodamine B", Analyst. 1995, 120, pp. 1199-1200.

\* cited by examiner

METHODS OF PRODUCING A GAS AT A CONTROLLED RATE

CROSS-REFERENCE TO RELATED APPLICATIONS

This application claims the benefit of priority to U.S. Provisional Application No. 62/642,745, filed Mar. 14, 2018, which is hereby incorporated herein by reference in its entirety.

BACKGROUND

Various methods of producing chlorine dioxide and carbon dioxide are known in the art. However, the rates at which these methods produce the gasses are usually uncontrollable once the reaction is initiated. In many cases, the gas is produced very rapidly over a short period of time. Meanwhile, many uses of these gases would benefit from having control over the rate of the release of the gas. Accordingly, methods to produce gasses such as chlorine dioxide and/or carbon dioxide at a variable rate are still needed. The methods discussed herein address these and other needs.

SUMMARY

In accordance with the purposes of the disclosed compositions and methods, as embodied and broadly described herein, the disclosed subject matter relates to methods of producing a gas at a controlled rate.

Disclosed herein are methods of producing a gas at a controlled rate, the method comprising directing air through a layered bed to produce a gas from a precursor, wherein the layered bed comprises alternating layers of a layer of dry particles comprising the precursor and a layer of dry particles comprising a proton-generating species. In some examples, the layer in the bed first contacted with the air is a layer of dry particles comprising the proton-generating species. In some examples, the layered bed comprises the alternating layers and further comprises at least one layer comprising a mixture of dry particles comprising a precursor and dry particles comprising a proton-generating species.

In some examples, the dry particles comprising the precursor can include a porous carrier wherein the precursor is impregnated in the porous carrier. Exemplary porous carriers include, but are not limited to, silica, pumice, diatomaceous earth, bentonite, clay, zeolite (e.g., zeolite crystals), or mixtures thereof. In some examples, the dry particles comprising the precursor include from 1% to 90% by weight of the precursor (e.g., from 1% to 50%, from 1% to 30%, or from 3% to 15%).

In some embodiments, the dry precursor particles can, for example, comprise a chlorine dioxide precursor and the gas can comprise chlorine dioxide; the dry precursor particles can comprise a carbon dioxide precursor and the gas can comprise carbon dioxide; or a combination thereof.

The chlorine dioxide precursor can, for example, comprise a chlorine dioxide-producing compound selected from the group consisting of a metal chlorite, a metal chlorate, chloric acid, hypochlorous acid, and combinations thereof. Examples of metal chlorites include, but are not limited to, sodium chlorite, barium chlorite, calcium chlorite, lithium chlorite, potassium chlorite, magnesium chlorite, and combinations thereof. Examples of metal chlorates include, but are not limited to, sodium chlorate, lithium chlorate, potassium chlorate, magnesium chlorate, barium chlorate, and combinations thereof.

The carbon dioxide precursor can, for example, comprise a carbon-containing compound selected from the group consisting of carbonates, bicarbonates, sesquicarbonates, and combinations thereof. Examples of carbon-containing compounds include, but are not limited to, sodium carbonate, sodium bicarbonate, sodium sesquicarbonate, and combinations thereof.

The proton-generating species can, for example, comprise an organic acid, an inorganic acid, a metal salt, or a combination thereof. In some examples, the organic acid and/or an inorganic acid can be selected from the group consisting of acetic acid, citric acid, hydrochloric acid, phosphoric acid, propionic acid, sulfuric acid, and combinations thereof. Examples of metal salts include, but are not limited to, ferric chloride, ferric sulfate, $CaCl_2$, $ZnSO_4$, $ZnCl_2$, $CoSO_4$, $CoCl_2$, $MnSO_4$, $MnCl_2$, $CuSO_4$, $CuCl_2$, $MgSO_4$, sodium acetate, sodium citrate, sodium sulfate, sodium bisulfate, hydrogen phosphate, disodium hydrogen phosphate, and combinations thereof.

In some examples, the dry particles comprising the proton-generating species can further comprise a porous carrier and the proton-generating species can be impregnated in the porous carrier. Exemplary porous carriers include, but are not limited to, silica, pumice, diatomaceous earth, bentonite, clay, zeolite (e.g., zeolite crystals), or mixtures thereof. In some examples, the dry particles comprising the proton-generating species include from 1% to 90% by weight of the proton-generating species (e.g., from 1% to 50%, from 10% to 40%, or from 10% to 30%).

In the methods describes herein, the rate the gas is produced at is controlled. For example, the gas is produced at a rate that is controlled by controlling the presence or absence of air flowing though the layered bed, the amount of time the air flows through the layered bed, the total number of layers in the layered bed, the average thickness of each of the layers of dry particles comprising the precursor in the layered bed, the average thickness of each of the layers of dry particles comprising the proton-generating species in the layered bed, the temperature the method is performed at, or a combination thereof.

In some examples, the rate the gas is produced at is controlled by controlling the presence or absence of air flowing through the layered bed. In some examples, the air can have a humidity of from 20% to 100% (e.g., from 50% to 80%). The air can flow through the layered bed at a rate of from 0.1 $m^3$/hour to 1700 $m^3$/hour.

The total number of layers in the layered bed is 3 or more (e.g., 4 layers or more, 6 layers or more, or 8 layers or more). In some examples, the total number of layers in the layered bed can be from 3 layers to 48 layers (e.g., from 4 layers to 16 layers).

Each layer of the layered bed can have an average thickness, wherein the thickness of a layer is the dimension of the layer that the air traverses during fluid flow. For example, the average thickness of each of the layers of dry particles comprising the precursor in the layered bed can be from 1 cm to 50 cm (e.g., from 2.5 cm to 10 cm). The average thickness of each of the layers of dry particles comprising the proton-generating species in the layered bed can be from 1 cm to 50 cm (e.g., from 2.5 cm to 10 cm). In some examples, the average thickness of each of the layers in the layered bed can be from 1 cm to 50 cm (e.g., 2.5 cm to 10 cm).

In some examples, the rate the gas is produced at is controlled by controlling the temperature the method is performed at. In some examples, the method can be performed at a temperature of −25° C. to 50° C., from −15° C. to −17° C., or from 32° C. to 38° C.

In some examples, the gas is produced at a rate of from 0.1 gram of gas per day per kilogram of precursor initially present to 600 g of gas per day per kilogram of precursor. In some examples, the gas is produced in an amount of from 360 grams of gas per kilogram of precursor initially present to 600 g of gas/kg of precursor.

In some examples, 75% or more of the precursor is converted to the gas (e.g., 80% or more, 85% or more, 90% or more, 95% or more, or 99% or more). In some examples, 50% or more (e.g., 60% or more, 70% or more, 80% or more, or 90% or more) of the precursor can be converted to the gas in 7 days or less. In some examples, 50% or more (e.g., 60% or more, 70% or more, 80% or more, or 90% or more) of the precursor can be converted to the gas in 2 months or more.

Additional advantages of the disclosed compositions and methods will be set forth in part in the description which follows, and in part will be obvious from the description. The advantages of the disclosed compositions will be realized and attained by means of the elements and combinations particularly pointed out in the appended claims. It is to be understood that both the foregoing general description and the following detailed description are exemplary and explanatory only and are not restrictive of the disclosed compositions and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
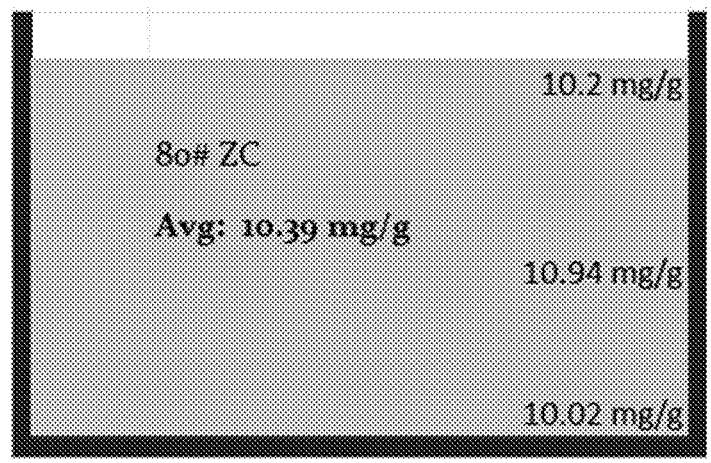
FIG. 1 is a schematic diagram of a bed of solid sodium chlorite impregnated on zeolite particles (ZC).

The compositions and methods described herein may be understood more readily by reference to the following detailed description of specific aspects of the disclosed subject matter and the examples included therein.

Throughout the description and claims of this specification the word "comprise" and other forms of the word, such as "comprising" and "comprises," means "including but not limited to," and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

Disclosed herein are methods of producing a gas at a controlled rate, the method comprising directing air through a layered bed to produce a gas from a precursor, wherein the layered bed comprises alternating layers of a layer of dry particles comprising the precursor and a layer of dry particles comprising a proton-generating species. Although the methods herein are described as using air, the methods can encompass the use of other components (e.g., nitrogen). For example, the air can comprise an acidic gas compound such as hydrogen cyanide, hydrogen sulfide, hydrochloric acid, hydrogen fluoride, hydrogen iodide, hydrogen bromide, nitric acid vapor, chlorine, carbon disulfide, mercaptans, or a combination thereof.

As used herein, the term "dry particles" indicates the particles have a water content of 20% or less (e.g., 15% or less, 10% or less, 5% or less, 4% or less, 3% or less, 2% or less, or 1% or less) by weight. In some examples, the layer in the bed first contacted with the air is a layer of dry particles comprising the proton-generating species. In some examples, the layered bed comprises the alternating layers and further comprises at least one layer comprising a mixture of dry particles comprising a precursor and dry particles comprising a proton-generating species.

The dry particles comprising the precursor can be provided in any form that allows the precursor to react with the proton-generating species to produce the gas. In some examples, the dry particles comprising the precursor are in the form of a powder. In some examples, the dry particles comprising the precursor can include a porous carrier wherein the precursor is impregnated in the porous carrier. In some examples, the porous carrier is inert. In some examples, the porous carrier has pores, channels, or the like located therein. Exemplary porous carriers include, but are not limited to, silica, pumice, diatomaceous earth, bentonite, clay, porous polymer, alumina, zeolite (e.g., zeolite crystals), or mixtures thereof.

The porous carrier can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For an anisotropic particle, the average particle size can refer to, for example, the average maximum dimension of the particle (e.g., the length of a rod shaped particle, the diagonal of a cube shaped particle, the bisector of a triangular shaped particle, etc.) Mean particle size can be measured using methods known in the art, such as sieving or microscopy.

In some examples, the porous carrier can have an average particle size, in its largest dimension, of 0.5 micrometers (microns, µm) or more (e.g., 1 µm or more, 2 µm or more, 3 µm or more, 4 µm or more, 5 µm or more, 10 µm or more, 15 µm or more, 20 µm or more, 25 µm or more, 30 µm or more, 35 µm or more, 40 µm or more, 50 µm or more, 60 µm or more, 70 µm or more, 80 µm or more, 90 µm or more, 100 µm or more, 125 µm or more, 150 µm or more, 175 µm or more, 200 µm or more, 225 µm or more, 250 µm or more, 300 µm or more, 350 µm or more, 400 µm or more, 450 µm or more, 500 µm or more, 600 µm or more, 700 µm or more, 800 µm or more, 900 µm or more, 1 millimeters (mm) or more, 2 mm or more, 3 mm or more, 4 mm or more, 5 mm or more, 6 mm or more, 7 mm or more, 8 mm or more, 9 mm or more, 10 mm or more, 15 mm or more, or 20 mm or more). In some examples, the porous carrier can have an average particle size of 25.4 mm (e.g., 1 inch) or less (e.g., 24 mm or less, 23 mm or less, 22 mm or less, 21 mm or less, 20 mm or less, 19 mm or less, 18 mm or less, 17 mm or less, 16 mm or less, 15 mm or less, 14 mm or less, 13 mm or less, 12 mm or less, 11 mm or less, 10 mm or less, 9 mm or less, 8 mm or less, 7 mm or less, 6 mm or less, 5 mm or less, 4 mm or less, 3 mm or less, 2 mm or less, 1 mm or less, 900 µm or less, 800 µm or less, 700 µm or less, 600 µm or less, 500 µm or less, 450 µm or less, 400 µm or less, 350 µm or less, 300 µm or less, 250 µm or less, 225 µm or less, 200 µm or less, 175 µm or less, 150 µm or less, 125 µm or less, 100 µm or less, 90 µm or less, 80 µm or less, 70 µm or less, 60 µm or less, 50 µm or less, 40 µm or less, 35 µm or less, 30 µm or less, 25 µm or less, 20 µm or less, 15 µm or less, 10 µm or less, or 5 µm or less). The average particle size of the porous carrier in their largest dimension can range from any of the minimum values described above to any of the maximum values described above. For example, the porous carrier can have an average particle size of from 0.5 µm to 25.4 mm (e.g., 0.5 µm to 1 mm, from 1 mm to 25.4 mm, from 0.5 µm to 100 µm, from 100 µm to 500 µm, from 500 µm to 1 mm, from 1 mm to 10 mm, from 10 mm to 25.4 mm, from 175 µm to 400 µm, or from 600 µm to 2 mm). The average particle size of the porous carrier can be selected in view of a variety of factors. In some examples, the average particle size of the porous carrier can be selected based on the desired rate of gas production. In some examples, the average particle size of the porous carrier can be selected based on the desired average thickness of a layer in the layered bed. In some embodiments, the porous carrier is uniformly impregnated throughout the volume of the porous carrier via the pores, channels, and the like, with the precursor.

In some examples, the dry particles comprising the precursor include 1% or more by weight of the precursor (e.g., 2% or more, 3% or more, 4% or more, 5% or more, 6% or more, 7% or more, 8% or more, 9% or more, 10% or more, 15% or more, 20% or more, 25% or more, 30% or more, 35% or more, 40% or more, 45% or more, 50% or more, 60% or more, 70% or more, or 80% or more). In some examples. The dry particle comprising the precursor includes 90% or less by weight of the precursor (e.g., 85% or less, 80% or less, 75% or less, 70% or less, 65% or less, 60% or less, 55% or less, 50% or less, 40% or less, 30% or less, 20% or less, 15% or less, 10% or less, or 5% or less). In some embodiments, the dry particles comprising the precursor includes a porous carrier impregnated with a precursor and the porous carrier includes 1% or more by weight of the precursor (such as in the amounts provided above) and/or 50% or less by weight of the precursor (e.g., 40% or less, 30% or less, 20% or less, or 10% or less). The amount of precursor in the dry particles comprising the precursor can range from any of the minimum values described above to any of the maximum values described above. For example, the dry particle comprising the precursor can include from 1% to 90% by weight of the precursor (e.g., from 1% to 45%, from 45% to 90%, from 1% to 30%, from 30% to 60%, from 60% to 90%, from 10% to 90%, from 1% to 50%, from 1% to 45%, from 1% to 40%, from 1% to 30%, from 1% to 20%, or from 3% to 15%).

In some examples, the porous carrier is impregnated with the precursor by using a porous carrier that has a low moisture (e.g., water) content. In some examples, the low moisture content is 20% or less (e.g., 15% or less, 10% or less, 5% or less, 4% or less, 3% or less, 2% or less, or 1% or less) by weight. In some examples, the porous carrier has an initial moisture content above 5% and thus can be dehydrated to produce a moisture content of 5% or less. In some examples, the dehydrated porous carrier is then immersed in or sprayed with an aqueous solution of the precursor at an elevated temperature (e.g., in the range from 120° F. to 190° F.) and the resulting slurry is thoroughly mixed. In some examples, the mixed slurry is then air-dried to a moisture level of 20% or less (e.g., 15% or less, 10% or less, 5% or less, 4% or less, 3% or less, 2% or less, or 1% or less) by weight to produce the impregnate (i.e., precursor impregnated in a porous carrier) disclosed herein. In some examples, the impregnate disclosed herein can be prepared without a drying step by calculating the amount of the aqueous solution of the precursor needed to achieve the desired final moisture level (e.g., 20% or less, 15% or less, 10% or less, 5% or less, 4% or less, 3% or less, 2% or less, or 1% or less) and adding this amount of the aqueous solution to the dehydrated porous carrier to impregnate the porous carrier, thereby forming the dry particles comprising the precursor.

In some examples, the precursor is impregnated into a porous carrier and treated with a base. In some examples, the base is any suitable base that can reduce the available protons and inhibit the reaction until the proton-generating species overcomes the base and reacts with the precursor, to enhance shelf stability and slow the reaction rate once the mixture is activated. Exemplary bases include, but are not limited to, potassium hydroxide, sodium hydroxide, calcium hydroxide, or a blend thereof.

In some embodiments, the dry precursor particles can, for example, comprise a chlorine dioxide precursor and the gas can comprise chlorine dioxide; the dry precursor particles can comprise a carbon dioxide precursor and the gas can comprise carbon dioxide; or a combination thereof.

The chlorine dioxide precursor can be selected from any composition capable of producing chlorine dioxide gas when mixed with the dry particles comprising the proton-generating species. The chlorine dioxide precursor can, for example, comprise a chlorine dioxide-producing compound selected from the group consisting of a metal chlorite, a metal chlorate, chloric acid, hypochlorous acid, and combinations thereof. Examples of metal chlorites include, but are not limited to, sodium chlorite, barium chlorite, calcium chlorite, lithium chlorite, potassium chlorite, magnesium chlorite, and combinations thereof. Examples of metal chlorates include, but are not limited to, sodium chlorate, lithium chlorate, potassium chlorate, magnesium chlorate, barium chlorate, and combinations thereof. In some examples, the chlorine dioxide precursor is impregnated in a porous carrier such as zeolite crystals as described above and as described in U.S. Pat. Nos. 5,567,405; 5,573,743; 5,730,948; 5,776,850; 5,853,689; 5,885,543; 6,174,508; 6,379,643; 6,423,289; 7,347,994; 7,922,992; and 9,382,116, which are incorporated by reference in their entirety.

The carbon dioxide precursor can be selected from any composition capable of producing carbon dioxide gas when mixed with the dry particles comprising the proton-generating species. The carbon dioxide precursor can, for example, comprise a carbon-containing compound selected from the group consisting of carbonates, bicarbonates, sesquicarbonates, and combinations thereof. Examples of carbon-containing compounds include, but are not limited to, sodium carbonate, sodium bicarbonate, sodium sesquicarbonate, and combinations thereof. In some examples, the carbon dioxide precursor is impregnated in a porous carrier such as zeolite crystals as described above and as described in U.S. Pat. Nos. 7,992,992 and 8,709,396, which are hereby incorporated herein by reference in their entirety.

A proton-generating species as disclosed herein can be any composition capable of generating protons to react with the precursor to generate the gas. The proton-generating species can, for example, comprise an organic acid, an inorganic acid, a metal salt, or a combination thereof. In some examples, the organic acid and/or an inorganic acid can be selected from the group consisting of acetic acid, citric acid, hydrochloric acid, phosphoric acid, propionic acid, sulfuric acid, and combinations thereof. Examples of metal salts include, but are not limited to, ferric chloride, ferric sulfate, $CaCl_2$, $ZnSO_4$, $ZnCl_2$, $CoSO_4$, $CoCl_2$, $MnSO_4$, $MnCl_2$, $CuSO_4$, $CuCl_2$, $MgSO_4$, sodium acetate, sodium citrate, sodium sulfate, sodium bisulfate, hydrogen phosphate, disodium hydrogen phosphate, and combinations thereof. In some examples, the proton-generating species can comprise a volatile acid.

The dry particles comprising the proton-generating species can be provided in any form that allows the release of protons. In some examples, the proton-generating species is in the form of a powder. In some examples, the dry particles comprising the proton-generating species can further comprise a porous carrier and the proton-generating species can be impregnated in the porous carrier. In some examples, the porous carrier is inert. In some examples, the porous carrier has pores, channels, or the like located therein. Exemplary porous carriers include, but are not limited to, silica, pumice, diatomaceous earth, bentonite, clay, porous polymer, alumina, zeolite (e.g., zeolite crystals), or mixtures thereof. In some examples, the porous carrier is a zeolite. In some examples, the porous carrier can have an average particle size, in their largest dimension, of 0.5 micrometers (microns, μm) or more (e.g., 1 μm or more, 2 μm or more, 3 μm or more, 4 μm or more, 5 μm or more, 10 μm or more, 15 μm or more, 20 μm or more, 25 μm or more, 30 μm or more, 35 μm or more, 40 μm or more, 50 μm or more, 60 μm or more, 70 μm or more, 80 μm or more, 90 μm or more, 100 μm or more, 125 μm or more, 150 μm or more, 175 μm or more, 200 μm or more, 225 μm or more, 250 μm or more, 300 μm or more, 350 μm or more, 400 μm or more, 450 μm or more, 500 μm or more, 600 μm or more, 700 μm or more, 800 μm or more, 900 μm or more, 1 millimeters (mm) or more, 2 mm or more, 3 mm or more, 4 mm or more, 5 mm or more, 6 mm or more, 7 mm or more, 8 mm or more, 9 mm or more, 10 mm or more, 15 mm or more, or 20 mm or more). In some examples, the porous carrier can have an average particle size of 25.4 mm (e.g., 1 inch) or less (e.g., 24 mm or less, 23 mm or less, 22 mm or less, 21 mm or less, 20 mm or less, 19 mm or less, 18 mm or less, 17 mm or less, 16 mm or less, 15 mm or less, 14 mm or less, 13 mm or less, 12 mm or less, 11 mm or less, 10 mm or less, 9 mm or less, 8 mm or less, 7 mm or less, 6 mm or less, 5 mm or less, 4 mm or less, 3 mm or less, 2 mm or less, 1 mm or less, 900 μm or less, 800 μm or less, 700 μm or less, 600 μm or less, 500 μm or less, 450 μm or less, 400 μm or less, 350 μm or less, 300 μm or less, 250 μm or less, 225 μm or less, 200 μm or less, 175 μm or less, 150 μm or less, 125 μm or less, 100 μm or less, 90 μm or less, 80 μm or less, 70 μm or less, 60 μm or less, 50 μm or less, 40 μm or less, 35 μm or less, 30 μm or less, 25 μm or less, 20 μm or less, 15 μm or less, 10 μm or less, or 5 μm or less), in their largest dimension. The average particle size of the porous carrier in their largest dimension can range from any of the minimum values described above to any of the maximum values described above. For example, the porous carrier can have an average particle size of from 0.5 μm to 25.4 mm (e.g., 0.5 μm to 1 mm, from 1 mm to 25.4 mm, from 0.5 μm to 100 μm, from 100 μm to 500 μm, from 500 μm to 1 mm, from 1 mm to 10 mm, from 10 mm to 25.4 mm, from 175 μm to 400 μm, or from 600 μm to 2 mm). The average particle size of the porous carrier can be selected in view of a variety of factors. In some examples, the average particle size of the porous carrier can be selected based on the desired rate of gas production. In some examples, the average particle size of the porous carrier can be selected based on the desired average thickness of a layer in the layered bed. In some examples, the porous carrier is uniformly impregnated throughout the volume of the porous carrier via the pores, channels, and the like, with the proton-generating species.

In some examples, the dry particles comprising the proton-generating species include 1% or more by weight of the proton-generating species (e.g., 5% or more, 10% or more, 15% or more, 20% or more, 25% or more, 30% or more, 35% or more, 40% or more, 45% or more, 50% or more, 60% or more, 70% or more, or 80% or more). In some examples, the dry particles comprising the proton-generating species include 90% or less by weight of the proton-generating species (e.g., 85% or less, 80% or less, 75% or less, 70% or less, 65% or less, 60% or less, 55% or less, 50% or less, 40% or less, 30% or less, 20% or less, or 10% or less). In some embodiments, the dry particles comprising the proton-generating species includes a porous carrier impregnated with a proton-generating species and the porous carrier includes 1% or more by weight of the proton-generating species (such as in the amounts provided above) and/or 50% or less by weight of the proton-generating species (e.g., 40% or less, 30% or less, 20% or less, or 10% or less). The amount of proton-generating species in the dry particles comprising the proton-generating species can range from any of the minimum values described above to any of the maximum values described above. For example, the dry particle comprising the proton-generating species can include from 1% to 90% by weight of the proton-generating species (e.g., from 1% to 45%, from 45% to 90%, from 1% to 30%, from 30% to 60%, from 60% to 90%, from 10% to 90%, from 1% to 50%, from 5% to 50%, from 5% to 45%, from 10% to 40%, or from 10% to 30%).

In some examples, the porous carrier is impregnated with the proton-generating species by using a porous carrier that has a low moisture (e.g., water) content. In some embodiments, the low moisture content is 20% or less (e.g., 15% or less, 10% or less, 5% or less, 4% or less, 3% or less, 2% or less, or 1% or less) by weight. In some embodiments, the porous carrier has an initial moisture content above 5% and thus can be dehydrated to produce a moisture content of 5% or less. In some embodiments, the dehydrated porous carrier is then immersed in or sprayed with an aqueous solution of the proton-generating species at an elevated temperature (e.g., in the range from 120° F. to 190° F.) and the resulting slurry is thoroughly mixed. In some embodiments, the mixed slurry is then air-dried to a moisture level of from 0% to 20% (e.g., 20% or less, 15% or less, 10% or less, 5% or less, 4% or less, 3% or less, 2% or less, or 1% or less) by weight to produce an impregnate (i.e., proton-generating species impregnated in a porous carrier). In some embodiments, the impregnate disclosed herein can be prepared without a drying step by calculating the amount of the aqueous solution of the proton-generating species needed to achieve the desired final moisture level (e.g., 20% or less, 15% or less, 10% or less, 5% or less, 4% or less, 3% or less, 2% or less, or 1% or less) and adding this amount of the aqueous solution to the dehydrated porous carrier to impregnate the porous carrier, thereby forming the dry particles comprising the proton-generating species.

In the methods describes herein, the rate at which the gas is produced is controlled. For example, the gas is produced at a rate that is controlled by controlling the presence or absence of air flowing though the layered bed, the amount of time the air flows through the layered bed, the total number of layers in the layered bed, the average thickness of each of the layers of dry particles comprising the precursor in the layered bed, the average thickness of each of the layers of dry particles comprising the proton-generating species in the layered bed, the temperature the method is performed at, or a combination thereof.

In some examples, the rate the gas is produced at is controlled by controlling the presence or absence of air flowing through the layered bed. In some examples, the air can have a humidity of 20% or more, wherein the humidity is non-condensing (e.g., 25% or more, 30% or more, 35% or more, 40% or more, 45% or more, 50% or more, 60% or more, 70% or more, 80% or more, or 90% or more). In some examples, the air can have a humidity of 100% or less, wherein the humidity is non-condensing (e.g., 95% or less, 90% or less, 85% or less, 80% or less, 75% or less, 70% or less, 60% or less, 50% or less, 40% or less, or 30% or less). The amount of humidity in the air flowed through the layered bed can range from any of the minimum values described above to any of the maximum values described above. For example, the air can have a humidity of from 20% to 100%, wherein the humidity is non-condensing (e.g., from 20% to 60%, from 60% to 100%, from 20% to 40%, from 40% to 60%, from 60% to 80%, from 80% to 100%, or from 50% to 80%).

The air can flow through the layered bed at a rate of 0.1 $m^3$/hour or more (e.g., 0.2 $m^3$/hour or more, 0.3 $m^3$/hour or more, 0.4 $m^3$/hour or more, 0.5 $m^3$/hour or more, 1 $m^3$/hour or more, 1.5 $m^3$/hour or more, 2 $m^3$/hour or more, 3 $m^3$/hour or more, 4 $m^3$/hour or more, 5 $m^3$/hour or more, 10 $m^3$/hour or more, 15 $m^3$/hour or more, 20 $m^3$/hour or more, 25 $m^3$/hour or more, 30 $m^3$/hour or more, 40 $m^3$/hour or more, 50 $m^3$/hour or more, 60 $m^3$/hour or more, 70 $m^3$/hour or more, 80 $m^3$/hour or more, 90 $m^3$/hour or more, 100 $m^3$/hour or more, 125 $m^3$/hour or more, 150 $m^3$/hour or more, 175 $m^3$/hour or more, 200 $m^3$/hour or more, 225 $m^3$/hour or more, 250 $m^3$/hour or more, 300 $m^3$/hour or more, 350 $m^3$/hour or more, 400 $m^3$/hour or more, 450 $m^3$/hour or more, 500 $m^3$/hour or more, 600 $m^3$/hour or more, 700 $m^3$/hour or more, 800 $m^3$/hour or more, 900 $m^3$/hour or more, 1000 $m^3$/hour or more, 1250 $m^3$/hour or more, or 1500 $m^3$/hour or more).

In some examples, the air can flow through the layered bed at a rate of 1700 $m^3$/hour or less (e.g., 1600 $m^3$/hour or less, 1500 $m^3$/hour or less, 1400 $m^3$/hour or less, 1300 $m^3$/hour or less, 1200 $m^3$/hour or less, 1100 $m^3$/hour or less, 1000 $m^3$/hour or less, 900 $m^3$/hour or less, 800 $m^3$/hour or less, 700 $m^3$/hour or less, 600 $m^3$/hour or less, 500 $m^3$/hour or less, 450 $m^3$/hour or less, 400 $m^3$/hour or less, 350 $m^3$/hour or less, 300 $m^3$/hour or less, 250 $m^3$/hour or less, 200 $m^3$/hour or less, 175 $m^3$/hour or less, 150 $m^3$/hour or less, 125 $m^3$/hour or less, 100 $m^3$/hour or less, 90 $m^3$/hour or less, 80 $m^3$/hour or less, 70 $m^3$/hour or less, 60 $m^3$/hour or less, 50 $m^3$/hour or less, 40 $m^3$/hour or less, 30 $m^3$/hour or less, 25 $m^3$/hour or less, 20 $m^3$/hour or less, 15 $m^3$/hour or less, 10 $m^3$/hour or less, 5 $m^3$/hour or less, 4 $m^3$/hour or less, 3 $m^3$/hour or less, 2 $m^3$/hour or less, or 1 $m^3$/hour or less). The rate that the air flows through the layered bed can range from any of the minimum values described above to any of the maximum values described above. For example, the air can flow through the layered bed at a rate of from 0.1 $m^3$/hour to 1700 $m^3$/hour (e.g., from 0.1 $m^3$/hour to 800 $m^3$/hour, from 800 $m^3$/hour to 1700 $m^3$/hour, from 0.1 $m^3$/hour to 10 $m^3$/hour, from 10 $m^3$/hour to 100 $m^3$/hour, from 100 $m^3$/hour to 1700 $m^3$/hour, or from 10 $m^3$/hour to 1500 $m^3$/hour).

In some examples, the air flows through the layered bed for an amount of time of 1 minute or more (e.g., 5 minutes or more, 10 minutes or more, 15 minutes or more, 30 minutes or more, 45 minutes or more, 1 hour or more, 2 hours or more, 3 hours or more, 4 hours or more, 6 hours or more, 8 hours or more, 10 hours or more, 12 hours or more, 16 hours or more, 20 hours or more, 1 day or more, 1.5 days or more, 2 days or more, 2.5 days or more, 3 days or more, 4 days or more, 5 days or more, 6 days or more, 7 days or more, 14 days or more, 21 days or more, 35 days or more, 42 days or more, 49 days or more, 56 days or more, 63 days or more, 70 days or more, 77 days or more, or 84 days or more). In some examples, the air flows through the layered bed for an amount of time of 90 days or less (e.g., 84 days or less, 77 days or less, 70 days or less, 63 days or less, 56 days or less, 49 days or less, 42 days or less, 35 days or less, 21 days or less, 14 days or less, 7 days or less, 6 days or less, 5 days or less, 4 days or less, 3 days or less, 2.5 days or less, 2 days or less, 1.5 days or less, 1 day or less, 20 hours or less, 16 hours or less, 12 hours or less, 10 hours or less, 8 hours or less, 6 hours or less, 4 hours or less, 3 hours or less, 2 hours or less, 1 hour or less, 45 minutes or less, 30 minutes or less, 15 minutes or less, or 10 minutes or less). The time that the air flows through the layered bed can range from any of the minimum values described above to any of the maximum values described above. For example, the air can flow through the layered bed for an amount of time of from 1 minute to 90 days (e.g., from 1 minutes to 45 days, from 45 days to 90 days, from 1 minute to 1 hour, from 1 hour to 1 day, from 1 day to 7 days, from 7 days to 30 days, from 30 days to 60 days, from 60 days to 90 days, from 1 minute to 66 days, or from 5 minutes to 45 days).

In some examples, the air flows through the layered bed for a first amount of time, after which the flow of air through the layered bed ceases for a second amount of time. The second amount of time can be, for example, 1 minute or more (e.g., 5 minutes or more, 10 minutes or more, 15 minutes or more, 30 minutes or more, 45 minutes or more, 1 hour or more, 2 hours or more, 3 hours or more, 4 hours or more, 6 hours or more, 8 hours or more, 10 hours or more, 12 hours or more, 16 hours or more, 20 hours or more, 1 day or more, 1.5 days or more, 2 days or more, 2.5 days or more, 3 days or more, 4 days or more, 5 days or more, 6 days or more, 7 days or more, 14 days or more, 21 days or more, 35 days or more, 42 days or more, 49 days or more, 56 days or more, 63 days or more, 70 days or more, 77 days or more, or 84 days or more). In some examples, the second amount of time can be 90 days or less (e.g., 84 days or less, 77 days or less, 70 days or less, 63 days or less, 56 days or less, 49 days or less, 42 days or less, 35 days or less, 21 days or less, 14 days or less, 7 days or less, 6 days or less, 5 days or less, 4 days or less, 3 days or less, 2.5 days or less, 2 days or less, 1.5 days or less, 1 day or less, 20 hours or less, 16 hours or less, 12 hours or less, 10 hours or less, 8 hours or less, 6 hours or less, 4 hours or less, 3 hours or less, 2 hours or less, 1 hour or less, 45 minutes or less, 30 minutes or less, 15 minutes or less, or 10 minutes or less). The second amount of time can range from any of the minimum values described above to any of the maximum values described above. For example, the second amount of time can be from 1 minute to 90 days (e.g., from 1 minutes to 45 days, from 45 days to 90 days, from 1 minute to 1 hour, from 1 hour to 1 day, from 1 day to 7 days, from 7 days to 30 days, from 30 days to 60 days, from 60 days to 90 days, from 1 minute to 66 days, or from 5 minutes to 45 days).

In some examples, after the second amount of time, the air flows through the layered bed for a third amount of time. The third amount of time can be, for example, 1 minute or more (e.g., 5 minutes or more, 10 minutes or more, 15 minutes or more, 30 minutes or more, 45 minutes or more, 1 hour or more, 2 hours or more, 3 hours or more, 4 hours or more, 6 hours or more, 8 hours or more, 10 hours or more, 12 hours or more, 16 hours or more, 20 hours or more, 1 day or more, 1.5 days or more, 2 days or more, 2.5 days or more, 3 days or more, 4 days or more, 5 days or more, 6 days or more, 7 days or more, 14 days or more, 21 days or more, 35 days or more, 42 days or more, 49 days or more, 56 days or more, 63 days or more, 70 days or more, 77 days or more, or 84 days or more). In some examples, the third amount of time can be 90 days or less (e.g., 84 days or less, 77 days or less, 70 days or less, 63 days or less, 56 days or less, 49 days or less, 42 days or less, 35 days or less, 21 days or less, 14 days or less, 7 days or less, 6 days or less, 5 days or less, 4 days or less, 3 days or less, 2.5 days or less, 2 days or less, 1.5 days or less, 1 day or less, 20 hours or less, 16 hours or less, 12 hours or less, 10 hours or less, 8 hours or less, 6 hours or less, 4 hours or less, 3 hours or less, 2 hours or less, 1 hour or less, 45 minutes or less, 30 minutes or less, 15 minutes or less, or 10 minutes or less). The third amount of time can range from any of the minimum values described above to any of the maximum values described above. For example, the third amount of time can be from 1 minute to 90 days (e.g., from 1 minute to 45 days, from 45 days to 66 days, from 1 minute to 1 hour, from 1 hour to 1 day, from 1 day to 7 days, from 7 days to 30 days, from 30 days to 60 days, from 60 days to 90 days, from 1 minute to 66 days, or from 5 minutes to 45 days). In some examples, likewise, after the third amount of time, the flow of air through the layered bed ceases for a fourth amount of time, and after the fourth amount of time, the air flows through the layered bed for a fifth amount of time. The flow of air through the layered bed can be thus pulsed for any desired number of times, with the amount of time that the air flows through the layered bed and the amount of time that the air ceases to flow through the layered bed can independently be selected in view of a variety of factors, such as the desired rate at which the gas is produced.

The total number of layers in the layered bed is 3 or more (e.g., 4 layers or more, 5 layers or more, 6 layers or more, 7 layers or more, 8 layers or more, 9 layers or more, 10 layers or more, 11 layers or more, 12 layers or more, 13 layers or more, 14 layers or more, 15 layers or more, 16 layers or more, 17 layers or more, 18 layers or more, 19 layers or more, 20 layers or more, 22 layers or more, 24 layers or more, 26 layers or more, 28 layers or more, 30 layers or more, 35 layers or more, or 40 layers or more). In some examples, the total number of layers in the layered bed is 48 layers or less (e.g., 46 layers or less, 44 layers or less, 42 layers or less, 40 layers or less, 38 layers or less, 36 layers or less, 34 layers or less, 32 layers or less, 30 layers or less, 28 layers or less, 26 layers or less, 24 layers or less, 22 layers or less, 20 layers or less, 19 layers or less, 18 layers or less, 17 layers or less, 16 layers or less, 15 layers or less, 14 layers or less, 13 layers or less, 12 layers or less, 11 layers or less, 10 layers or less, 9 layers or less, 8 layers or less, 7 layers or less, 6 layers or less, or 5 layers or less). The total number of layered in the layered bed can range from any of the minimum values described above to any of the maximum values described above. For example, the total number of layers in the layered bed can be from 3 layers to 48 layers (e.g., from 3 layers to 24 layers, from 24 layers to 48 layers, from 3 layers to 30 layers, from 3 layers to 20 layers, or from 4 layers to 16 layers).

Each layer of the layered bed can have an average thickness, wherein the thickness of a layer is the dimension of the layer that the air traverses during fluid flow. For example, the average thickness of each of the layers of dry particles comprising the precursor in the layered bed can be 1 centimeter (cm) or more (e.g., 1.5 cm or more, 2 cm or more, 2.5 cm or more, 3 cm or more, 3.5 cm or more, 4 cm or more, 4.5 cm or more, 5 cm or more, 6 cm or more, 7 cm or more, 8 cm or more, 9 cm or more, 10 cm or more, 15 cm or more, 20 cm or more, 25 cm or more, 30 cm or more, 35 cm or more, or 40 cm or more). In some examples, the average thickness of each of the layers of dry particles comprising the precursor in the layered bed can be 50 cm or less (e.g., 45 cm or less, 40 cm or less, 35 cm or less, 30 cm or less, 25 cm or less, 20 cm or less, 15 cm or less, 10 cm or less, 9 cm or less, 8 cm or less, 7 cm or less, 6 cm or less, 5 cm or less, 4.5 cm or less, 4 cm or less, 3.5 cm or less, 3 cm or less, or 2.5 cm or less). The average thickness of each of the layers of dry particles comprising the precursor in the layered bed can range from any of the minimum values described above to any of the maximum values described above. For example, the average thickness of each of the layers of dry particles comprising the precursor in the layered bed can be from 1 cm to 50 cm (e.g., from 1 cm to 25 cm, from 25 cm to 50 cm, from 1 cm to 40 cm, from 1 cm to 30 cm, from 1 cm to 20 cm, or from 2.5 cm to 10 cm).

The average thickness of each of the layers of dry particles comprising the proton-generating species in the layered bed can be 1 centimeter (cm) or more (e.g., 1.5 cm or more, 2 cm or more, 2.5 cm or more, 3 cm or more, 3.5 cm or more, 4 cm or more, 4.5 cm or more, 5 cm or more, 6 cm or more, 7 cm or more, 8 cm or more, 9 cm or more, 10 cm or more, 15 cm or more, 20 cm or more, 25 cm or more, 30 cm or more, 35 cm or more, or 40 cm or more). In some examples, the average thickness of each of the layers of dry particles comprising the proton-generating species in the layered bed can be 50 cm or less (e.g., 45 cm or less, 40 cm or less, 35 cm or less, 30 cm or less, 25 cm or less, 20 cm or less, 15 cm or less, 10 cm or less, 9 cm or less, 8 cm or less, 7 cm or less, 6 cm or less, 5 cm or less, 4.5 cm or less, 4 cm or less, 3.5 cm or less, 3 cm or less, or 2.5 cm or less). The average thickness of each of the layers of dry particles comprising the proton-generating species in the layered bed can range from any of the minimum values described above to any of the maximum values described above. For example, the average thickness of each of the layers of dry particles comprising the proton-generating species in the layered bed can be from 1 cm to 50 cm (e.g., from 1 cm to 25 cm, from 25 cm to 50 cm, from 1 cm to 40 cm, from 1 cm to 30 cm, from 1 cm to 20 cm, or from 2.5 cm to 10 cm).

In some examples, the average thickness of each of the layers of dry particles comprising the precursor in the layered bed can be substantially the same as the average thickness of each of the layers of dry particles comprising the proton-generating species in the layered bed. For example, the average thickness of each of the layers in the layered bed can be 1 centimeter (cm) or more (e.g., 1.5 cm or more, 2 cm or more, 2.5 cm or more, 3 cm or more, 3.5 cm or more, 4 cm or more, 4.5 cm or more, 5 cm or more, 6 cm or more, 7 cm or more, 8 cm or more, 9 cm or more, 10 cm or more, 15 cm or more, 20 cm or more, 25 cm or more, 30 cm or more, 35 cm or more, or 40 cm or more). In some examples, the average thickness of each of the layers in the layered bed can be 50 cm or less (e.g., 45 cm or less, 40 cm or less, 35 cm or less, 30 cm or less, 25 cm or less, 20 cm or less, 15 cm or less, 10 cm or less, 9 cm or less, 8 cm or less, 7 cm or less, 6 cm or less, 5 cm or less, 4.5 cm or less, 4 cm or less, 3.5 cm or less, 3 cm or less, or 2.5 cm or less). The average thickness of each of the layers in the layered bed can range from any of the minimum values described above to any of the maximum values described above. For example, the average thickness of each of the layers in the layered bed can be from 1 cm to 50 cm (e.g., from 1 cm to 25 cm, from 25 cm to 50 cm, from 1 cm to 40 cm, from 1 cm to 30 cm, from 1 cm to 20 cm, or from 2.5 cm to 10 cm).

In some examples, the bed can further include a porous woven or nonwoven layer between one or more of the layers to separate the layers. The woven or nonwoven layer can be formed of a polymer material such as polyethylene, polypropylene or polyester (e.g., polyethylene terephthalate (PET)). For example, the porous separator layer can be a spun bond nonwoven polyester layer.

In some examples, the rate the gas is produced at is controlled by controlling the temperature the method is performed at. In some examples, the method can be performed at a temperature of −25° C. or more (e.g., −20° C. or more, −19° C. or more, −18° C. or more, −17° C. or more, −16° C. or more, −15° C. or more, −10° C. or more, −5° C. or more, 0° C. or more, 5° C. or more, 10° C. or more, 15° C. or more, 20° C. or more, 25° C. or more, 30° C. or more, 31° C. or more, 32° C. or more, 33° C. or more, 34° C. or more, 35° C. or more, 36 37 38 39 or 40° C. or more). In some examples, the method can be performed at a temperature of 50° C. or less (e.g., 45° C. or less, 40° C. or less, 39° C. or less, 38° C. or less, 37° C. or less, 36° C. or less, 35° C. or less, 34° C. or less, 33° C. or less, 32° C. or less, 31° C. or less, 30° C. or less, 25° C. or less, 20° C. or less, 15° C. or less, 10° C. or less, 5° C. or less, 0° C. or less, −5° C. or less, −10° C. −15° C. or less −16° C. or less, or −17° C. or less). The temperature at which the method is performed can range from any of the minimum values described above to any of the maximum values described above. For example, the method can be performed at a temperature of from −25° C. to 50° C. (e.g., from −25° C. to 15° C., from 15° C. to 50° C., from −25° C. to −15° C., from −15° C. to 0° C., from 0° C. to 25° C., from 25° C. to 50° C., from −15° C. to −17° C., or from 32° C. to 38° C.). In some examples, the gas is produced at a rate of 0.1 gram of gas per day per kilogram of precursor initially present or more (e.g., 0.5 g of gas/day/kg of precursor or more, 1 g of gas/day/kg of precursor or more, 2 g of gas/day/kg of precursor or more, 3 g of gas/day/kg of precursor or more, 4 g of gas/day/kg of precursor or more, 5 g of gas/day/kg of precursor or more, 10 g of gas/day/kg of precursor or more, 15 g of gas/day/kg of precursor or more, 20 g of gas/day/kg of precursor or more, 25 g of gas/day/kg of precursor or more, 30 g of gas/day/kg of precursor or more, 35 g of gas/day/kg of precursor or more, 40 g of gas/day/kg of precursor or more, 45 g of gas/day/kg of precursor or more, 50 g of gas/day/kg of precursor or more, 60 g of gas/day/kg of precursor or more 70 g of gas/day/kg of precursor or more, 80 g of gas/day/kg of precursor or more, 90 g of gas/day/kg of precursor or more, 100 g of gas/day/kg of precursor or more, 150 g of gas/day/kg of precursor or more, 200 g of gas/day/kg of precursor or more, 250 g of gas/day/kg of precursor or more, 300 g of gas/day/kg of precursor or more, 350 g of gas/day/kg of precursor or more, 400 g of gas/day/kg of precursor or more, 450 g of gas/day/kg of precursor or more, or 500 g of gas/day/kg of precursor or more). In some examples, the gas is produced at a rate of 600 g of gas per day per kg of precursor initially present or less (e.g., 550 g of gas/day/kg of precursor or less, 500 g of gas/day/kg of precursor or less, 450 g of gas/day/kg of precursor or less, 400 g of gas/day/kg of precursor or less, 350 g of gas/day/kg of precursor or less, 300 g of gas/day/kg of precursor or less, 250 g of gas/day/kg of precursor or less, 200 g of gas/day/kg of precursor or less, 150 g of gas/day/kg of precursor or less, 100 g of gas/day/kg of precursor or less, 90 g of gas/day/kg of precursor or less, 80 g of gas/day/kg of precursor or less, 70 g of gas/day/kg of precursor or less, 60 g of gas/day/kg of precursor or less, 50 g of gas/day/kg of precursor or less, 45 g of gas/day/kg of precursor or less, 40 g of gas/day/kg of precursor or less, 35 g of gas/day/kg of precursor or less, 30 g of gas/day/kg of precursor or less, 25 g of gas/day/kg of precursor or less, 20 g of gas/day/kg of precursor or less, 15 g of gas/day/kg of precursor or less, 10 g of gas/day/kg of precursor or less, 5 g of gas/day/kg of precursor or less, 4 g of gas/day/kg of precursor or less, 3 g of gas/day/kg of precursor or less, 2 g of gas/day/kg of precursor or less, or 1 g of gas/day/kg of precursor or less). The rate the gas is produced can range from any of the minimum values described above to any of the maximum values described above. For example, the gas can be produced at a rate of from 0.1 gram of gas per day per kilogram of precursor initially present to 600 g of gas per day per kilogram of precursor (e.g., from 0.1 g of gas/day/kg of precursor to 300 g of gas/day/kg of precursor, from 300 g of gas/day/kg of precursor to 600 g of gas/day/kg of precursor, from 0.1 g of gas/day/kg of precursor to 200 g of gas/day/kg of precursor from 200 g of gas/day/kg of precursor to 400 g of gas/day/kg of precursor from 400 g of gas/day/kg of precursor to 600 g of gas/day/kg of precursor, from 0.1 g of gas/day/kg of precursor to 500 g of gas/day/kg of precursor, from 0.1 g of gas/day/kg of precursor to 100 g of gas/day/kg of precursor, or from 1 g of gas/day/kg of precursor to 60 g of gas/day/kg of precursor).

In some examples, the gas is produced in an amount of 360 grams of gas/kilograms of precursor (initially present) (e.g., 380 g of gas/kg of precursor or more, 400 g of gas/kg of precursor or more, 420 g of gas/kg of precursor or more, 460 g of gas/kg of precursor or more, 480 g of gas/kg of precursor or more, 500 g of gas/kg of precursor or more, 520 g of gas/kg of precursor or more, 540 g of gas/kg of precursor or more, 560 g of gas/kg of precursor or more, or 580 g of gas/kg of precursor or more). In some examples, the gas is produced in an amount of 600 g of gas/kg of precursor initially present (e.g., 580 g of gas/kg of precursor or less, 560 g of gas/kg of precursor or less, 540 g of gas/kg of precursor or less, 520 g of gas/kg of precursor or less, 500 g of gas/kg of precursor or less, 480 g of gas/kg of precursor or less, 460 g of gas/kg of precursor or less, 440 g of gas/kg of precursor or less, 420 g of gas/kg of precursor or less, 400 g of gas/kg of precursor or less, or 380 g of gas/kg of precursor or less). The amount of gas produced can range from any of the minimum values described above to any of the maximum values described above. For example, the gas can be produced in an amount of from 360 g of gas/kg of precursor to 600 g of gas/kg of precursor (e.g., from 360 g of gas/kg of precursor to 480 g of gas/kg of precursor, from 480 g of gas/kg of precursor to 600 g of gas/kg of precursor, from 360 g of gas/kg of precursor to 400 g of gas/kg of precursor, from 400 g of gas/kg of precursor to 440 g of gas/kg of precursor, from 440 g of gas/kg of precursor to 480 g of gas/kg of precursor, from 480 g of gas/kg of precursor to 520 g of gas/kg of precursor, from 520 g of gas/kg of precursor to 560 g of gas/kg of precursor, from 560 g of gas/kg of precursor to 600 g of gas/kg of precursor, or from 380 g of gas/kg of precursor to 560 g of gas/kg of precursor).

The average particle size of the dry particles comprising the precursor, the average particle size of the dry particles comprising the proton-generating species, the presence or absence of air flowing through the layered bed, the amount of time the air flow through the layered bed, the amount of humidity in the air, the amount of precursor in the dry particles comprising the precursor, the amount of proton-generating species in the dry particles comprising the proton-generating species, the identity of the precursor, the identity of the proton-generating species, the amount of the dry particles comprising the precursor, the amount of the dry particles comprising the proton-generating species, the total number of layers in the layered bed, the average thickness of each of the layers of dry particles comprising the precursor in the layered bed, the average thickness of each of the layers of dry particles comprising the proton-generating species in the layered bed, the temperature the method is performed at, or a combination thereof, can be selected to control the total amount of gas produced and/or the rate at which the gas is produced.

In some examples, 75% or more of the precursor is converted to the gas (e.g., 76% or more, 77% or more, 78% or more, 79% or more, 80% or more, 81% or more, 82% or more, 83% or more, 84% or more, 85% or more, 86% or more, 87% or more, 88% or more, 89% or more, 90% or more, 91% or more, 92% or more, 93% or more, 94% or more, 95% or more, 96% or more, 97% or more, 98% or more, 99% or more, 99.1% or more, 99.2% or more, 99.3% or more, 99.4% or more, 99.5% or more, 99.6% or more, 99.7% or more, 99.8% or more, or 99.9% or more)

In some examples, 50% or more (e.g., 60% or more, 70% or more, 80% or more, or 90% or more) of the precursor can be converted to the gas in 7 days or less (e.g., 6 days or less, 5 days or less, 4 days or less, 3 days or less, 2 days or less, 1 day or less, 18 hours or less, 12 hours or less, 6 hours or less, 5 hours or less, 4 hours or less, 3 hours or less, 2 hours or less, 1 hour or less, 45 minutes or less, 30 minutes or less, 15 minutes or less, or 10 minutes or less).

In some examples, 50% or more (e.g., 60% or more, 70% or more, 80% or more, or 90% or more) of the precursor can be converted to the gas in 2 months or more (e.g., 3 months or more, 4 months or more, 5 months or more, or 6 months or more).

The dry particles comprising the precursor and the dry particles comprising the proton-generating species are generally stable and can be assembled into a layered bed prior to use in an application. The dry particles comprising the precursor and the dry particles comprising the proton-generating species can be stored and shipped separately at minimal humidity. For example, the dry particles comprising the precursor and the dry particles comprising the proton-generating species can each be provided in separate sealed drums. The drums can be opened and the layered bed can be prepared just prior to use. In some examples, the layered bed can be prepared within a drum.

In some examples, such as those exemplified in U.S. Pat. No. 9,382,116, the layered bed can be prepared prior to shipment. The dry particles comprising the precursor and a layer of dry particles comprising a proton-generating species are generally stable prior to the flow of air through the bed and the particles are exposed to environmental humidity. The bed is preferably stored and shipped at minimal humidity, e.g., less than 5%, to prevent activation of the proton-generating species. For example, the bed can be provided in a sealed drum as the enclosure with minimal humidity therein to maintain stability of the bed until it is used. In some embodiments, the amount of chlorine dioxide or carbon dioxide produced in 24 hours when the enclosure is opened after 27 days of storage is 90% or greater (e.g., 91% or greater, 92% or greater, 93% or greater, 94% or greater, 95% or greater, 96% or greater, 97% or greater, 98% or greater, or 99% or greater) of the amount of chlorine dioxide produced in 24 hours when the enclosure is opened after 0 days of storage. In some embodiments, the amount of chlorine dioxide or carbon dioxide produced in 48 hours when the enclosure is opened after 27 days of storage is 90% or greater (e.g., 91% or greater, 92% or greater, 93% or greater, 94% or greater, 95% or greater, 96% or greater, 97% or greater, 98% or greater, or 99% or greater) of the amount of chlorine dioxide produced in 48 hours when the enclosure is opened after 0 days of storage. Methods of maintaining the stability of the layered bed in storage are described in U.S. Pat. No. 9,382,116, which is incorporated by reference herein in its entirety.

The examples below are intended to further illustrate certain aspects of the methods and compounds described herein and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in °C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

As used herein, particles are described as being within a size range, such as 40×80 mesh and 14×30 mesh. This notation is another way of writing −40+80 mesh and −14+30 mesh. In the case of the 40×80 mesh material, this notation means that 90% or more of the material would pass through a 40 mesh sieve (or screen) but would be retained on an 80 mesh sieve. The term "mesh" refers to the size opening in a US Standard sieve.

Example 1

Chlorine dioxide was generated by forcing air upward through a bed of solid sodium chlorite impregnated on zeolite particles (ZC, 6×8 mesh) within a blower chamber (designated, Blower Chamber #1). The blower chamber is a rectangular device with a 2500 CFM blower in the base and a removable rectangular insert measuring 19"W×19"L× 10"D over the blower. An exhaust port measuring 4" in diameter is centered in the top of the device. The air flow is vertical through the bed and out the top port. The air flow varies depending on the density and depth of the media bed. The bottom of the chamber was lined with a layer of polymer filter material, which was a spun bonded polyester material of 0.5" thickness for filtering out dust in the air handler systems. Eighty (80) lb. of ZC (or 36.3 kg) was spread evenly over the filter media-covered bottom of the chamber to a depth of about 6 inches. A sheet of the filter media was placed on top of the ZC, and the chamber was closed.

The air blower was turned on, forcing air through the bed at a rate of 3500 LPM (liters per minute) and vented to the outside through a 4-in diameter exhaust pipe. The unit was left running continuously for 21 days. At the end of 21 days, duplicate samples of the media were removed near the upper surface, bottom and middle of the bed and chemically analyzed to determine the remaining $ClO_2$-producing potential of ZC in the bed at the various sampling points.

The chemical analysis involved weighing a 10 g media sample into a Tyvec sachet. Ten (10) g of ferric chloride impregnated zeolite (ZF, 13.6%) was then added to the sachet, which was sealed, vigorously shaken to mix the ZC and ZF, and suspended over 40 mL of 5 wt % KI in an enclosed 1 qt canning jar for 24 hours. (The 24 hour period had been previously determined as sufficient time for all of the $ClO_2$ to be produced from a sample of ZC). The amount of $ClO_2$ produced during this analytical procedure was determined by iodometric titration of the KI solution at the end of 24 hours. The amounts of $ClO_2$ produced from samples at various sampling points were found to be respectively, 10, 10.9, and 10.2 mg $ClO_2$/g ZC at the top, middle, and bottom of the bed. The average of these three values is 10.4 mg $ClO_2$/g ZC, and represents the $ClO_2$-producing potential of the bed after the 21 day run. This is shown schematically in FIG. 1.

A sample of fresh ZC (control) was subjected to the above analysis to determine the total $ClO_2$-producing potential of unreacted ZC. Results of replicate sample showed this to be 11.5 mg $ClO_2$/g ZC. The total amount of $ClO_2$ produced per g of ZC during the 21 day run was determined by difference, 11.5−10.4=1.1 mg $ClO_2$/g ZC, which represented about 9.6% of the $ClO_2$-producing capacity of the fresh ZC. The total amount of $ClO_2$ produced was therefore, 1.1×36.3=39 g $ClO_2$. During the 21 day run, the production averaged about 1.9 g $ClO_2$/day.

Example 2

Figure 2:
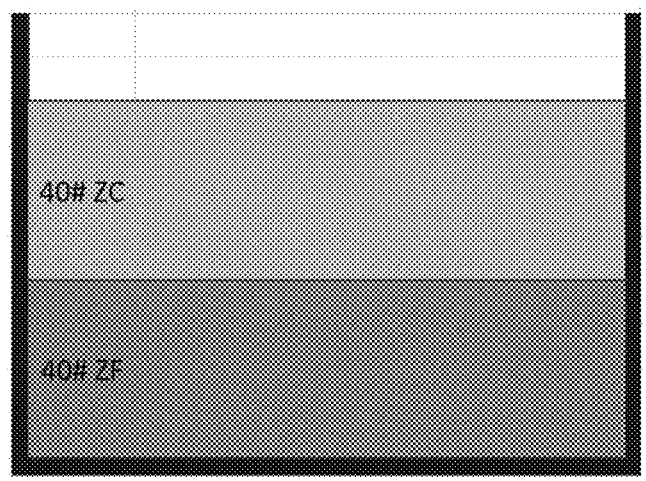
FIG. 2 is a schematic diagram of a 2-layer stratified bed of alternating 40 lb. layers of solid ZF (13.6%) and ZC particles.

Chlorine dioxide was generated by forcing air upward through a 2-layer stratified bed of solid, 6×8 mesh ZF (13.6%) and ZC particles within Blower Chamber #1 using the procedure described in Example 1. Forty (40) lb. of ZF was spread evenly over the filter media-covered bottom of the chamber to a depth of about 3 inches. A sheet of the filter media was placed on top of the ZF, and 40 lb. of ZC (or 18.2 kg) was spread evenly over the top of the covered ZF layer, to a depth of about 3 inches. This top layer was covered with a sheet of filter media, and the chamber was closed. A diagram of the layered bed is shown schematically in FIG. 2.

Figure 3:
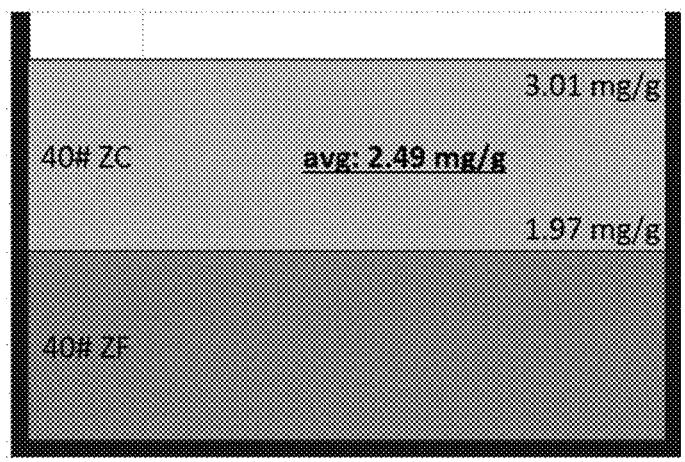
FIG. 3 is a schematic diagram of the results from Example 2.

The air blower was turned on, which forced air through the bed at a rate of 1100 LPM and vented to the outside of the unit through a 4-in diameter exhaust pipe. The unit was left running continuously for 14 days. At the end of the 14 days, duplicate samples of the media were removed near the top and bottom of the ZC layer of the bed, and chemically analyzed as in Example 1. The results showed that the ZC in the bed had a remaining $ClO_2$-producing potential of 2.5 mg $ClO_2$/g ZC (FIG. 3). The amount of $ClO_2$ produced per g ZC was found by difference, to be 9 mg $ClO_2$/g ZC, or 78.3% of the $ClO_2$-producing capacity of fresh ZC. The amount of $ClO_2$ produced was therefore, 9×18.2=163 g $ClO_2$. The averaged production rate over the 14 day run was 11.6 g $ClO_2$/day.

Example 3

Figure 4:
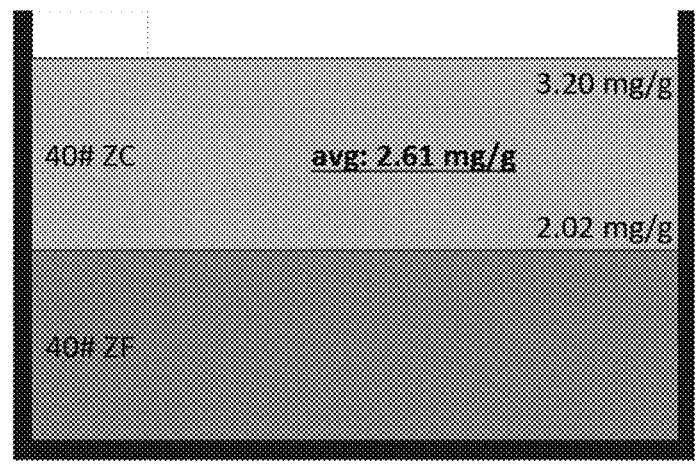
FIG. 4 is a schematic diagram of the results from Example 3.

This run was identical to that described in Example 2, except that it was conducted in an apparatus designated Blower Chamber #2. This unit has blower capability of up to 10 times that of Blower Chamber #1. In this run, the air flow rate was 10,000 L/min. The results were very similar to those of Example 2, and are shown schematically in FIG. 4. The remaining $ClO_2$-producing potential of the ZC after the 14 day run was 2.6 mg $ClO_2$/g ZC; the amount of $ClO_2$ produced per g ZC during the run was 8.9 mg/g, or 77.4% of the $ClO_2$-producing capacity of fresh ZC. The amount of $ClO_2$ produced was 8.9×18.2=161 g $ClO_2$. The averaged production rate over 14 days was 11.5 mg $ClO_2$/day.

Example 4

Figure 5:
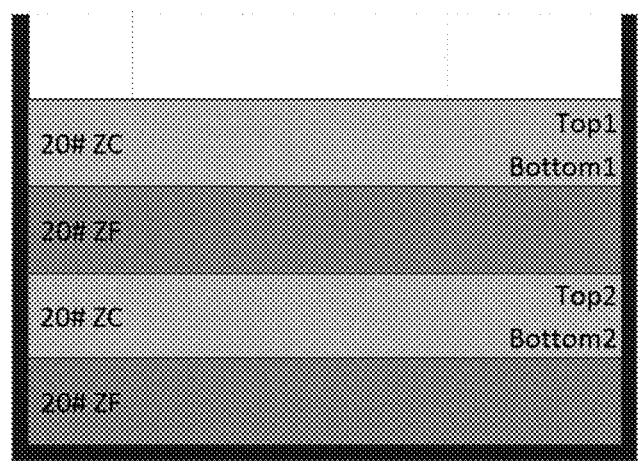
FIG. 5 is a schematic diagram of a 4-layer stratified bed of alternating 20 lb. (or 9.1 kg) layers of ZF and ZC, starting with ZF as the bottom layer.

Chlorine dioxide was generated by forcing air upward through a 4-layer stratified bed of alternating 20 lb. (or 9.1 kg) layers of ZF and ZC, starting with ZF as the bottom layer. A diagram of the layered bed is shown schematically in FIG. 5.

Figure 6:
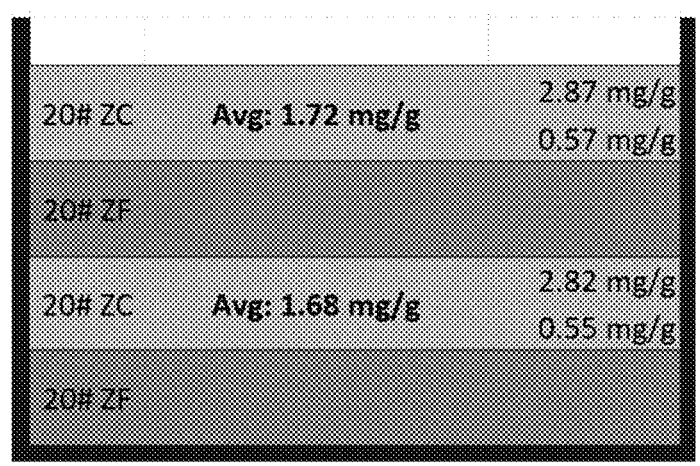
FIG. 6 is a schematic diagram of the results from Example 4.

The apparatus (Blower Chamber #1), procedure and analysis were identical to those of Example 2, with the exception that the run was conducted for 13 days, and samples of ZC at the end of the run were collected from the two ZC layers and analyzed. The air flow rate averaged 1060 LPM. The results of the analyses are shown schematically in FIG. 6. The analyses showed that the ZC in the two layers had an average remaining $ClO_2$-producing potential of 1.7 mg $ClO_2$/g ZC. The amount of $ClO_2$ produced per g ZC was found by difference to be 9.8 mg $ClO_2$/g ZC, or 85% of the $ClO_2$-producing capacity of fresh ZC. The amount of $ClO_2$ produced was 9.8×2×9.1=177 g $ClO_2$. The averaged production rate over 13 days was 13.7 g $ClO_2$/day.

Example 5

Figure 7:
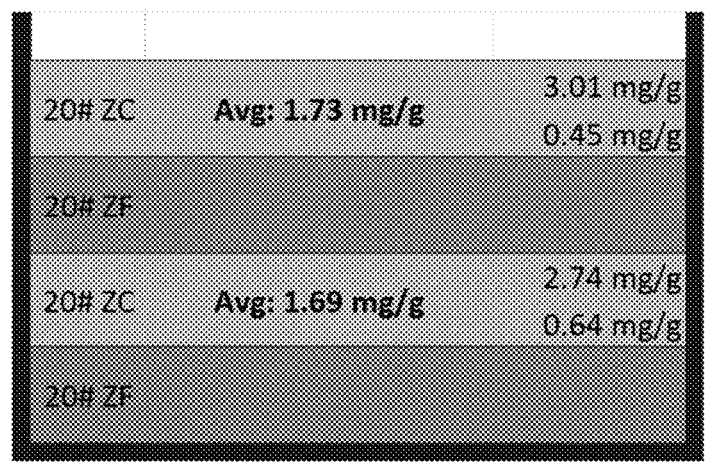
FIG. 7 is a schematic diagram of the results from Example 5.

This run was identical to that described in Example 4, except that Blower Chamber #2 was used, and the air flow rate was 11,000 LPM. The results were very similar to those of Example 4, and are shown schematically in FIG. 7. The amount of $ClO_2$ produced was 177 g $ClO_2$. The averaged production rate over 13 days was 13.7 g $ClO_2$/day.

Example 6

Figure 8:
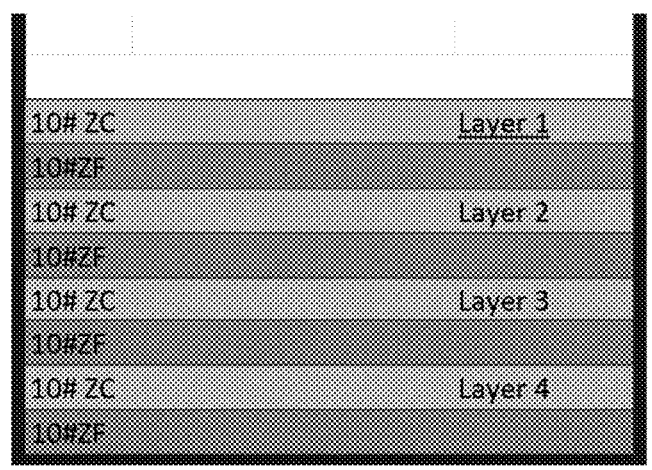
FIG. 8 is a schematic diagram of an 8-layer stratified bed of alternating 10 lb. (or 4.5 kg) layers of ZF and ZC, starting with ZF as the bottom layer.

Chlorine dioxide was generated by forcing air upward through an 8-layer stratified bed of alternating 10 lb. (or 4.5 kg) layers of ZF and ZC, starting with ZF as the bottom layer. A diagram of the layered bed is shown schematically in FIG. 8.

Figure 9:
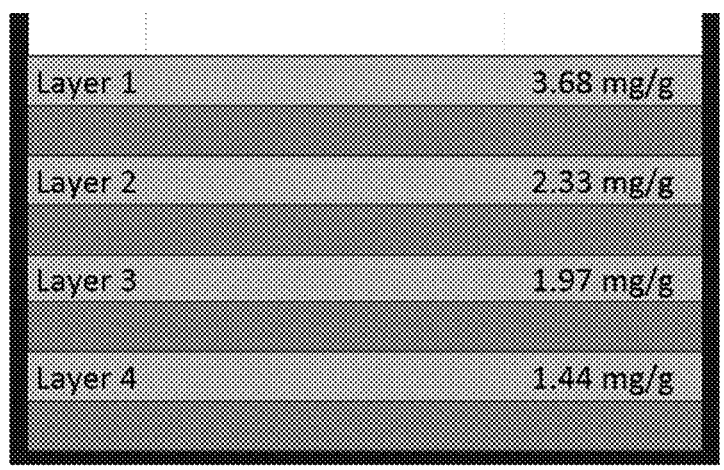
FIG. 9 is a schematic diagram of the results from Example 6.

The apparatus (Blower Chamber #1), procedure and analysis were identical to those of Example 4, with the exception that the run was conducted for 8 days, and samples of ZC at the end of the run were collected from the four ZC layers and analyzed. The air flow rate averaged 900 LPM. The results of the analyses are shown schematically in FIG. 9. The analyses showed that the ZC in the four layers had an average remaining $ClO_2$-producing potential of 2.4 mg $ClO_2$/g ZC. The amount of $ClO_2$ produced per g ZC was found by difference to be 9.1 mg $ClO_2$/g ZC, or 79% of the $ClO_2$-producing capacity of fresh ZC. The amount of $ClO_2$ produced was 9.1×4×4.5=166 g $ClO_2$. The averaged production rate over 8 days was 20.7 g $ClO_2$/day.

Example 7

Figure 10:
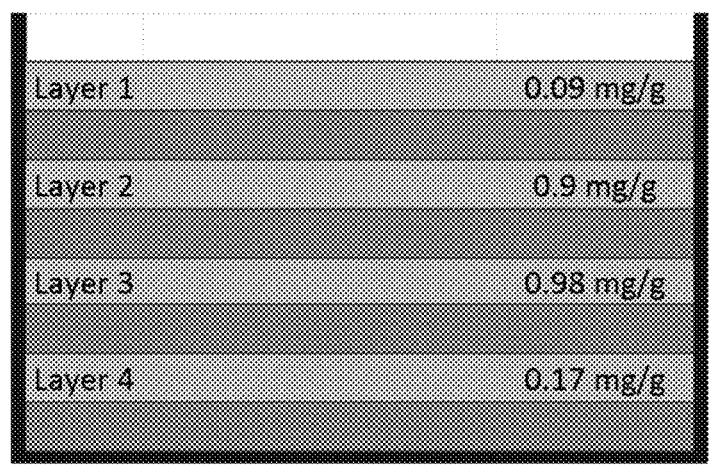
FIG. 10 is a schematic diagram of the results from Example 7.

This run was identical to that described in Example 6, except that Blower Chamber #2 was used, and the air flow rate was 11,500 LPM. The results are shown schematically in FIG. 10. The remaining $ClO_2$-producing potential of the ZC after the 8 day run was 0.5 mg $ClO_2$/g ZC; the amount of $ClO_2$ produced per g ZC during the run was 11 mg/g, or 95% of the $ClO_2$-producing capacity of fresh ZC. The amount of $ClO_2$ produced was 11×4×4.5=199 g $ClO_2$. The averaged production rate over 8 days was 24.8 mg $ClO_2$/g ZC.

Example 8

Figure 11:
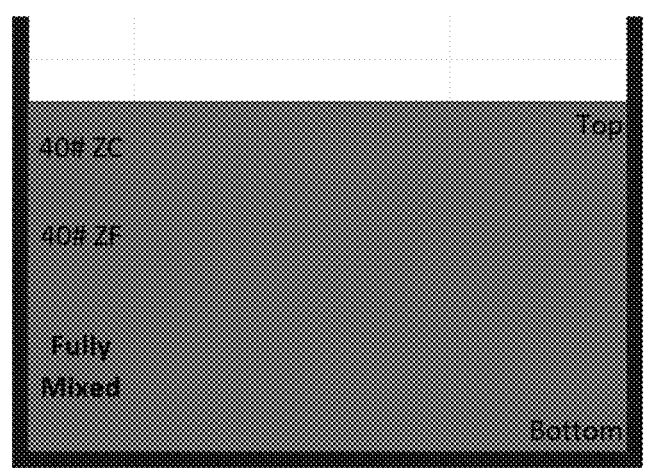
FIG. 11 is a schematic diagram of a premixed bed consisting of 40 lb. of solid, 6×8 mesh ZF (13.6%) and 40 lb. of ZC particles, uniformly mixed.

Chlorine dioxide was generated by forcing air upward through a premixed bed consisting of 40 lb. of solid, 6×8 mesh ZF (13.6%) and 40 lb. of ZC particles, uniformly mixed, within Blower Chamber #1. A diagram of the premixed bed is shown schematically in FIG. 11.

The procedure was identical to that of Example 1 except that air flow rate was 700 LPM, the run time was 5 days, and the analytical procedure was slightly modified to take into account the presence of ZF in bed samples. At the end of the run, samples near the top and bottom of the bed were collected for analysis.

The chemical analysis involved weighing a 20 g sample of the media into a Tyvec sachet. (Note: since the bed consists of an equal mixture of ZC and ZF, a 20 g sample would contain 10 g of ZC, which would place the analysis on the same basis as the analyses employed in the other examples). Ten (10) g of ZF (13.6%) was then added to the sachet, which was sealed, vigorously shaken to mix the ZC and ZF, and suspended over 40 mL of 5 wt % KI in an enclosed 1 qt canning jar for 24 hours. The amount of $ClO_2$ produced during this analytical procedure was determined by iodometric titration of the KI solution at the end of 24 hours. The rest of the procedure was identical to that of Example 1.

Figure 12:
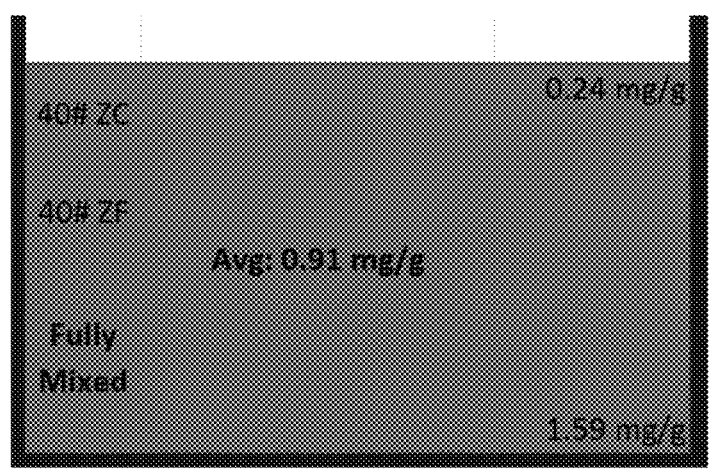
FIG. 12 is a schematic diagram of the results from Example 8.

The results of the analysis are shown schematically in FIG. 12. The amounts of $ClO_2$ produced from the two sampling points were found to be respectively, 0.2 and 1.6 mg $ClO_2$/g ZC at the top, and bottom of the bed. The average of these two values is 0.9 mg $ClO_2$/g ZC, and represents the $ClO_2$-producing potential of the bed after the 5 day run. By difference, the amount of $ClO_2$ produced per g ZC during the run was 10.6 mg/g, or 92% of the $ClO_2$-producing capacity of fresh ZC. The amount of $ClO_2$ produced was 10.6×18.2=192 g $ClO_2$. The averaged production rate over 5 days was 38.3 mg $ClO_2$/day.

Example 9

Figure 13:
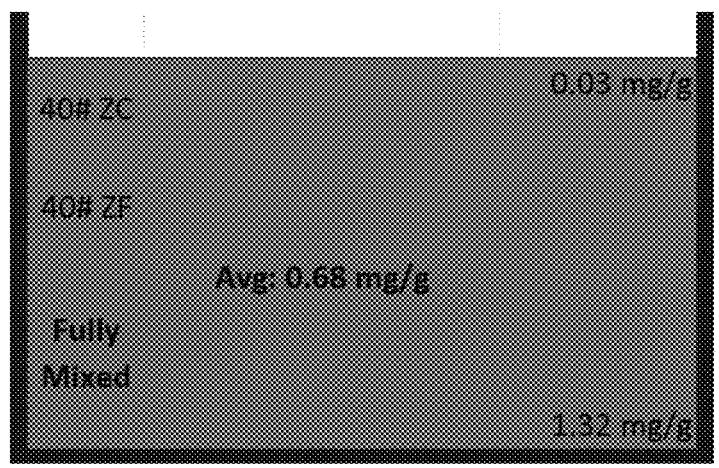
FIG. 13 is a schematic diagram of the results from Example 9.

This run was identical to that described in Example 8, except that Blower Chamber #2 was used, the air flow rate was 8800 LPM, and the run time was 6 days. The results are shown schematically in FIG. 13. The amounts of $ClO_2$ produced from the two sampling points were found to be 0.03 and 1.3 mg $ClO_2$/g ZC at the top and bottom of the bed, respectively. The average of these two values is 0.7 mg $ClO_2$/g ZC, and represents the $ClO_2$-producing potential of the bed after the 6 day run. By difference, the amount of $ClO_2$ produced per g ZC during the run was 10.8 mg/g, or 94% of the $ClO_2$-producing capacity of fresh ZC. The amount of $ClO_2$ produced was 10.8×18.2=196 g $ClO_2$. The averaged production rate over 6 days was 32.7 mg $ClO_2$/day.

Example 10

Figure 14:
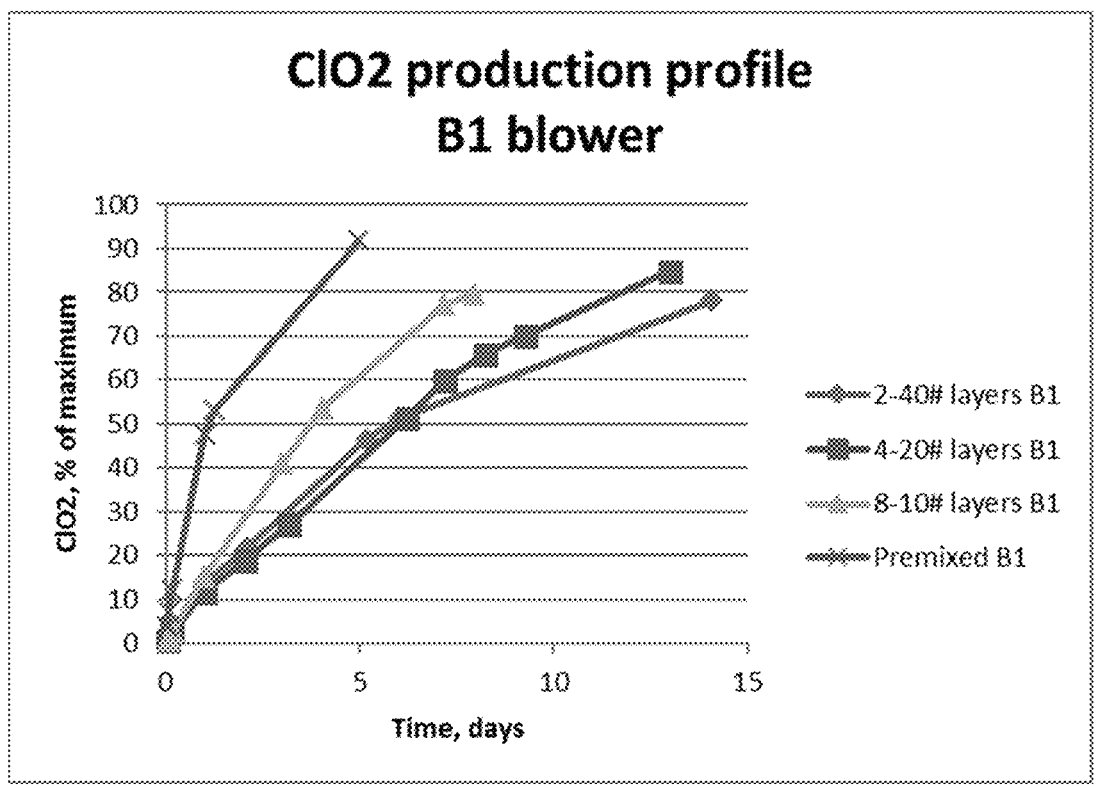
FIG. 14 is the time profiles of the percentage of the total $ClO_2$ production in Blower Chamber #1 for Examples 2, 4, 6, and 8.
Figure 15:
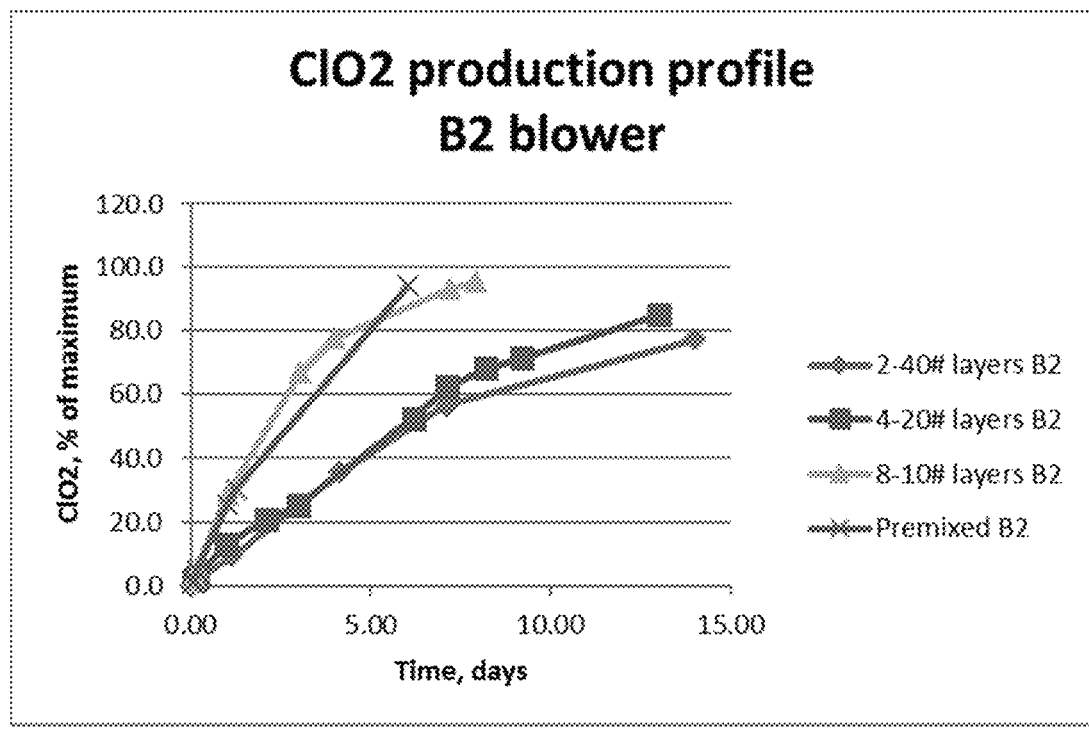
FIG. 15 is the time profiles of the percentage of the total $ClO_2$ production in Blower Chamber #2 for Examples 3, 5, 7, and 9.

In each of the above Examples 2-9, the total $ClO_2$ production was determined by measuring the $ClO_2$-production potential of bed particle samples at the beginning of each run and at the end of the run. In each example, the total production of $ClO_2$ as well as an average rate of $ClO_2$ production was determined. The $ClO_2$ production in these systems is not constant but is maximum at the beginning of each run, and declines with time. Time profiles of the percentage of the total $ClO_2$ production are shown in FIG. 14 for the Blower Chamber #1 for Examples 2, 4, 6, and 8. FIG. 15 is the time profiles of the percentage of the total $ClO_2$ production in Blower Chamber #2 for Examples 3, 5, 7, and 9. These profiles were determined in each of the above examples by sampling and analyzing the outlet gas for $ClO_2$ content at various times during each run. For sampling, a portion of the outlet gas stream was bubbled through potassium iodide (KI) solution in a gas impinger where the $ClO_2$ was sequestered as chlorite as KI was converted to iodine ($I_2$). The amount of $ClO_2$ in each sample was determined by a double titration with sodium thiosulfate under neutral and acidic conditions. The terms B1 and B2 refer to Blower Chamber #1, with the lower air flow rate (ca. 1000 LPM), and to Blower Chamber #2 with the higher air flow rate (ca. 10000 LPM).

The compositions and methods of the appended claims are not limited in scope by the specific compositions and methods described herein, which are intended as illustrations of a few aspects of the claims and any compositions and methods that are functionally equivalent are within the scope of this disclosure. Various modifications of the compositions and methods in addition to those shown and described herein are intended to fall within the scope of the appended claims. Further, while only certain representative compositions and methods, and aspects of these compositions and methods are specifically described, other compositions and methods and combinations of various features of the compositions and methods are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A method of producing a gas at a controlled rate, the method comprising:
   directing air to flow through a layered bed for a first amount of time to produce the gas from a precursor, after which the flow of air through the layered bed ceases for a second amount of time, and, after the second amount of time, air is directed through the layered bed for a third amount of time;
   wherein the layered bed comprises alternating layers of a layer of dry particles comprising the precursor and a layer of dry particles comprising a proton-generating species, wherein the total number of layers in the layered bed is 3 or more;
   wherein the gas is produced at a rate that is controlled by controlling the presence or absence of air flowing though the layered bed, the first amount of time for which the air flows through the layered bed, the second amount of time for which the flow of air through the layered bed ceases, the third amount of time for which the air flows through the layered bed, the total number of layers in the layered bed, the average thickness of each of the layers of dry particles comprising the precursor in the layered bed, and the average thickness of each of the layers of dry particles comprising the proton-generating species in the layered bed;
   wherein the dry precursor particles comprise a chlorine dioxide precursor and the gas comprises chlorine dioxide;
   wherein the average thickness of each of the layers of dry particles comprising the precursor in the layered bed is from 2.5 centimeters (cm) to 25 cm; and
   wherein the average thickness of each of the layers of dry particles comprising the proton-generating species in the layered bed is from 2.5 cm to 25 cm.

2. The method of claim 1, wherein 75% or more of the precursor is converted to the gas.

3. The method of claim 1, wherein the dry particles comprising the precursor further comprise a porous carrier selected from the group consisting of zeolite crystals, silica, pumice, diatomaceous earth, bentonite, and clay, and wherein the precursor is impregnated in the porous carrier.

4. The method of claim 1, wherein the dry particles comprising the precursor include from 1% to 90% by weight of the precursor.

5. The method of claim 1, wherein the dry precursor particles comprise a chlorine dioxide precursor and the chlorine dioxide precursor comprises a chlorine dioxide-producing compound selected from the group consisting of a metal chlorite, a metal chlorate, chloric acid, hypochlorous acid, and combinations thereof.

6. The method of claim 5, wherein the metal chlorite comprises sodium chlorite, barium chlorite, calcium chlorite, lithium chlorite, potassium chlorite, magnesium chlorite, or combinations thereof; or wherein the metal chlorate comprises sodium chlorate, lithium chlorate, potassium chlorate, magnesium chlorate, barium chlorate, or combinations thereof.

7. The method of claim 1, wherein the dry particles comprising the proton- generating species further comprise a porous carrier selected from the group consisting of zeolite crystals, silica, pumice, diatomaceous earth, bentonite, and clay, and wherein the proton-generating species is impregnated in the porous carrier.

8. The method of claim 1, wherein the dry particles comprising the proton-generating species include from 1% to 90% by weight of the proton-generating species.

9. The method of claim 1, wherein the proton-generating species comprises an organic acid, an inorganic acid, a metal salt, or a combination thereof.

10. The method of claim 9, wherein the proton-generating species comprises an organic acid and/or an inorganic acid selected from the group consisting of acetic acid, citric acid, hydrochloric acid, phosphoric acid, propionic acid, sulfuric acid, and combinations thereof.

11. The method of claim 9, wherein the proton-generating species comprises a metal salt selected from the group consisting of ferric chloride, ferric sulfate, $CaCl_2$, $ZnSO_4$, $ZnC_{12}$, $CoSO_4$, $CoC_{12}$, $MnSO_4$, $MnC_{12}$, $CuSO_4$, $CuC_{12}$, $MgSO_4$, sodium acetate, sodium citrate, sodium sulfate, sodium bisulfate, hydrogen phosphate, disodium hydrogen phosphate, and combinations thereof.

12. The method of claim 1, wherein the rate that the gas is produced at is further controlled by controlling the temperature the method is performed at and the method is performed at a temperature of from 25° C. to 50° C.

13. The method of claim 1, wherein the average thickness of each of the layers of dry particles comprising the precursor in the layered bed is from 2.5 cm to 10 cm; and the average thickness of each of the layers of dry particles comprising the proton-generating species in the layered bed is from 2.5 cm to 10 cm.

14. The method of claim 1, wherein the layer in the bed first contacted with the air is the layer of dry particles comprising the proton-generating species.

15. The method of claim 1, wherein the total number of layers in the layered bed is from 3 layers to 48 layers.

16. The method of claim 1, wherein the layered bed comprises the alternating layers and further comprises at least one layer comprising a mixture of dry particles comprising a precursor and dry particles comprising a proton-generating species.

17. The method of claim 1, wherein the gas is produced at a rate of from 0.1 to 600 grams of gas per day per kilogram of precursor initially present.

18. The method of claim 1, wherein the total number of layers in the layered bed is 5 or more.

* * * * *